US011105916B2

(12) United States Patent
Chu et al.

(10) Patent No.: US 11,105,916 B2
(45) Date of Patent: *Aug. 31, 2021

(54) NULL DATA PACKET (NDP) RANGING WITH UNASSOCIATED STATIONS

(71) Applicant: NXP USA, INC., Austin, TX (US)

(72) Inventors: Liwen Chu, San Ramon, CA (US); Hongyuan Zhang, Fremont, CA (US); Huiling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,920

(22) Filed: Apr. 29, 2020

(65) Prior Publication Data

US 2020/0256975 A1 Aug. 13, 2020

Related U.S. Application Data

(63) Continuation of application No. 15/987,716, filed on May 23, 2018, now Pat. No. 10,641,887.

(60) Provisional application No. 62/510,118, filed on May 23, 2017.

(51) Int. Cl.
| | |
|---|---|
| *H04W 64/00* | (2009.01) |
| *G01S 13/76* | (2006.01) |
| *H04W 40/02* | (2009.01) |
| *H04W 24/10* | (2009.01) |
| *H04W 84/12* | (2009.01) |

(52) U.S. Cl.
CPC .......... *G01S 13/765* (2013.01); *H04W 24/10* (2013.01); *H04W 40/02* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 9,100,154 B1* | 8/2015 | Jeffery | .................. | H04L 5/0023 |
| 9,585,058 B2* | 2/2017 | Seok | ...................... | H04W 48/08 |
| 10,142,960 B2* | 11/2018 | Chu | .................... | H04B 7/0697 |
| 10,264,544 B1* | 4/2019 | Chu | .................. | H04W 72/1205 |
| 2002/0085719 A1* | 7/2002 | Crosbie | ............. | H04W 36/0011 |
| | | | | 380/248 |

(Continued)

*Primary Examiner* — Jay P Patel

(57) ABSTRACT

An access point (AP) device of a wireless communication network determines that an unassociated client station requests to participate in a ranging measurement procedure with the AP device, and determines a preliminary network ID for uses by the unassociated client station during a ranging measurement session and while the unassociated client station remains unassociated with the wireless communication network. The AP device transmits a packet having the preliminary network ID, and after transmitting the packet having the preliminary network ID, participates in a multi-user (MU) null data packet (NDP) ranging measurement session with a plurality of client stations that includes the unassociated client station. Participating in the MU NDP ranging measurement session includes transmitting a trigger frame to prompt the plurality of client stations to simultaneously transmit respective NDPs as part of an uplink MU transmission corresponding to the MU NDP ranging measurement session, where the trigger frame includes the preliminary network ID.

21 Claims, 12 Drawing Sheets

(56) References Cited

U.S. PATENT DOCUMENTS

| | | | |
|---|---|---|---|
| 2013/0024692 A1* | 1/2013 | Volpano | H04L 12/4641 |
| | | | 713/169 |
| 2013/0128808 A1* | 5/2013 | Wentink | H04L 61/6022 |
| | | | 370/328 |
| 2014/0141779 A1* | 5/2014 | Yuk | H04W 28/08 |
| | | | 455/434 |
| 2014/0247743 A1* | 9/2014 | Seo | H04W 24/10 |
| | | | 370/252 |
| 2015/0098392 A1* | 4/2015 | Homchaudhuri | H04W 48/20 |
| | | | 370/329 |
| 2016/0029373 A1* | 1/2016 | Seok | H04L 1/1848 |
| | | | 370/338 |
| 2016/0037458 A1* | 2/2016 | Ponnuswamy | H04W 52/241 |
| | | | 370/338 |
| 2016/0044628 A1* | 2/2016 | Nakao | H04W 4/023 |
| | | | 455/456.2 |
| 2017/0127404 A1* | 5/2017 | Merlin | H04W 72/1289 |
| 2017/0142540 A1* | 5/2017 | Shirakata | H04B 7/0617 |
| 2017/0164416 A1* | 6/2017 | Yeddala | H04W 36/30 |
| 2017/0251332 A1* | 8/2017 | Aldana | G01S 5/0009 |
| 2017/0251449 A1* | 8/2017 | Malik | H04W 64/003 |
| 2017/0290076 A1* | 10/2017 | Guo | H04W 12/06 |
| 2017/0317726 A1* | 11/2017 | Abdallah | H04B 7/0626 |
| 2018/0070330 A1* | 3/2018 | Chu | H04B 7/0452 |
| 2018/0098377 A1* | 4/2018 | Allada | G06F 3/1454 |
| 2018/0145793 A1* | 5/2018 | Sakai | H04W 24/10 |
| 2018/0249437 A1* | 8/2018 | Lindskog | H04W 64/00 |
| 2018/0288806 A1* | 10/2018 | Roccapriore | G01S 13/74 |
| 2018/0310133 A1* | 10/2018 | Ramasamy | H04W 64/003 |
| 2019/0021106 A1* | 1/2019 | Oteri | H04L 1/0006 |
| 2020/0314220 A1* | 10/2020 | Segev | H04L 69/28 |

* cited by examiner

FIG. 5A

| Element ID 504 | Length 512 | Element ID Extension 508 | Reserved | Pre-AID 516 |
|---|---|---|---|---|
| 8 | 8 | 8 | 4 | 12 |

↙ 500

Bits:

FIG. 5B

| Element ID 504 | Length 508 | Element ID Extension 512 | Address Present 554 | Reserved | Pre-AID 516 | MAC Address 560 |
|---|---|---|---|---|---|---|
| 8 | 8 | 8 | 1 | 3 | 12 | 48 |

↙ 550

Bits:

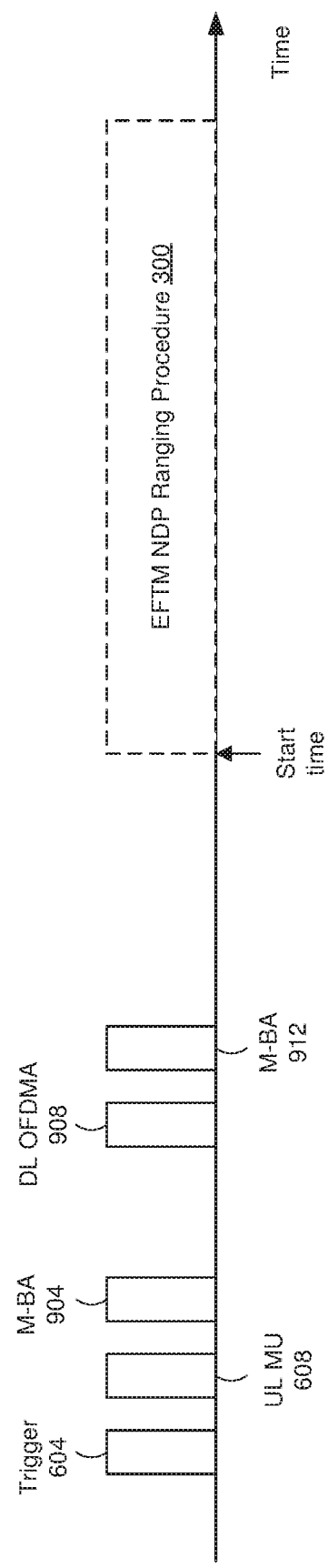

ନULL DATA PACKET (NDP) RANGING
WITH UNASSOCIATED STATIONS

CROSS REFERENCES TO RELATED
APPLICATIONS

This application is a continuation application of U.S. patent application entitled "NULL DATA PACKET (NDP) RANGING WITH UNASSOCIATED STATIONS", having a serial number of Ser. No. 15/987,716, having a filing date of May 23, 2018; which claims the benefit of the U.S. provisional application entitled "NULL DATA PACKET (NDP) RANGING FOR UNASSOCIATED STAs", having a serial number of 62/510,118, and having a filed date of May 23, 2017, having common inventors, and having a common assignee, all of which is incorporated by reference in its entirety.

FIELD OF TECHNOLOGY

The present disclosure relates generally to wireless communication systems, and more particularly to communication exchanges between wireless communication devices for ranging measurements among the wireless communication devices.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some mobile communication devices include a WLAN network interface and satellite positioning technology, such as global positioning system (GPS) technology. GPS technology in mobile communication devices is useful for navigating to a desired location, for example. However, GPS technology does not typically provide accurate location information when a GPS receiver is not in direct sight of a GPS satellite, and thus GPS technology is often not useful for providing location information while a mobile communication device is within a building such as an airport, a shopping mall, etc., within a tunnel, etc.

Techniques for determining a position of a communication device using WLAN technology are now under development. For example, a distance between a first communication and a second communication device is determined by measuring a time of flight of WLAN transmissions between the first communication device and the second communication device, and the determined distance. Similarly, distances between the first communication device and multiple third communication devices are determined. Then, the determined distances are used to estimate a location of the first communication device by employing, for example, a triangulation technique. For a first communication device having multiple antennas, an angle of departure (AoD) of a WLAN transmission can be determined. Similarly, for a second communication device having multiple antennas, an angle of arrival (AoA) of the WLAN transmission from the first communication device can be determined. The AoD and the AoA, along with the determined distances, can be also be used for estimating the location of the first communication device.

SUMMARY

In an embodiment, a method is for performing a ranging measurement procedure, and includes: determining, at an access point (AP) device of a wireless communication network, that an unassociated client station requests to participate in a ranging measurement procedure with the AP device, wherein the unassociated client station is not currently associated with the wireless communication network and has not been assigned, by the AP device, a network identifier (ID) as a result of becoming associated with the wireless communication network; determining, at the AP device, a preliminary network ID for the unassociated client station, the preliminary network ID to be used by the unassociated client station during a ranging measurement session while the unassociated client station remains not associated with the wireless communication network; transmitting, by the AP device, a packet having the preliminary network ID, wherein the packet indicates that the AP device has assigned the preliminary network ID to the unassociated client station for use during the ranging measurement session; and after transmitting the packet having the preliminary network ID, participating in, by the AP device, a multi-user (MU) null data packet (NDP) ranging measurement session with a plurality of client stations that includes the unassociated client station, wherein participating in the MU NDP ranging measurement session includes transmitting a trigger frame to prompt the plurality of client stations to simultaneously transmit respective NDPs as part of an uplink MU transmission corresponding to the MU NDP ranging measurement session, wherein the trigger frame includes the preliminary network ID to prompt the unassociated client station to transmit an NDP as part of the uplink MU transmission.

In another embodiment, an apparatus comprises a network interface device associated with an access point (AP) device of a wireless communication network. The network interface device includes one or more integrated circuits (ICs), and is configured to: determine that an unassociated client station requests to participate in a ranging measurement procedure with the AP device, wherein the unassociated client station is not currently associated with the wireless communication network and has not been assigned, by the AP device, a network identifier (ID) as a result of becoming associated with the wireless communication network; determine a preliminary network ID for the unassociated client station, the preliminary network ID to be used by the unassociated client station during a ranging measurement session while the unassociated client station remains not associated with the wireless communication network; transmit a packet having the preliminary network ID, wherein the packet indicates that the AP device has assigned the preliminary network ID to the unassociated client station for use during the ranging measurement session; and after transmitting the packet having the preliminary network ID, participate in a multi-user (MU) null data packet (NDP) ranging measurement session with a plurality of client stations that includes the unassociated client station, wherein participating in the MU NDP ranging measurement session includes transmitting a trigger frame to prompt the plurality of client stations to simultaneously transmit respective NDPs as part of an uplink MU transmission corresponding to the MU NDP ranging measurement session, wherein the trigger frame includes the preliminary network ID to prompt the unassociated client station to transmit an NDP as part of the uplink MU transmission.

In yet another embodiment, a method is for performing a ranging measurement procedure, and includes: receiving, at a first communication device, a packet having a preliminary network identifier (ID), wherein the packet indicates that an access point (AP) device of a wireless communication network has assigned the preliminary network ID to the first communication device for use during a ranging measurement session, wherein the first communication device is not currently associated with the wireless communication network and has not been assigned, by the AP device, a network ID as a result of becoming associated with the wireless communication network; and after receiving the packet having the preliminary network ID, participating in, by the first communication device, a multi-user (MU) null data packet (NDP) ranging measurement session with the AP device. Participating in the MU NDP ranging measurement session includes: receiving, at the communication device, a trigger frame configured to prompt a plurality of communication device, including the first communication device, to simultaneously transmit respective NDPs as part of an uplink MU transmission corresponding to the MU NDP ranging measurement session, wherein the trigger frame includes the preliminary network ID to prompt the first communication device to transmit a first NDP as part of the uplink MU transmission; and in response to the trigger frame, transmitting, by the first communication device, the first NDP as part of the uplink MU transmission.

In still another embodiment, an apparatus comprises a network interface device associated with a first communication device. The network interface device includes one or more integrated circuits (ICs), and is configured to: receive a packet having a preliminary network identifier (ID), wherein the packet indicates that an access point (AP) device of a wireless communication network has assigned the preliminary network ID to the first communication device for use during a ranging measurement session, wherein the first communication device is not currently associated with the wireless communication network and has not been assigned, by the AP device, a network ID as a result of becoming associated with the wireless communication network; and after receiving the packet having the preliminary network ID, participate in a multi-user (MU) null data packet (NDP) ranging measurement session with the AP device. The network interface device is also configured to, as part of participating in the MU NDP ranging measurement session: receive a trigger frame configured to prompt a plurality of communication device, including the first communication device, to simultaneously transmit respective NDPs as part of an uplink MU transmission corresponding to the MU NDP ranging measurement session, wherein the trigger frame includes the preliminary network ID to prompt the first communication device to transmit a first NDP as part of the uplink MU transmission; and in response to the trigger frame, transmit the first NDP as part of the uplink MU transmission.

BRIEF DESCRIPTION OF THE DRAWINGS

FIG. 5A is a diagram of an example information element for assigning a preliminary network identifier (ID) to an unassociated client station for use during an MU ranging measurement procedure, according to an embodiment.

FIG. 5B is a diagram of another example information element for assigning a preliminary network ID to an unassociated client station for use during an MU ranging measurement procedure, according to another embodiment.

FIG. 8C is an example format of contents of a frame body of the response frame of FIG. 8A, according to another embodiment.

FIG. 9 is a timing diagram of another example MU ranging measurement procedure, according to another embodiment.

DETAILED DESCRIPTION

Ranging measurement procedures and techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, ranging measurement procedures and techniques are utilized in other types of wireless communication systems such as personal area networks (PANs), mobile communication networks such as cellular networks, metropolitan area networks (MANs), etc.

Figure 1:
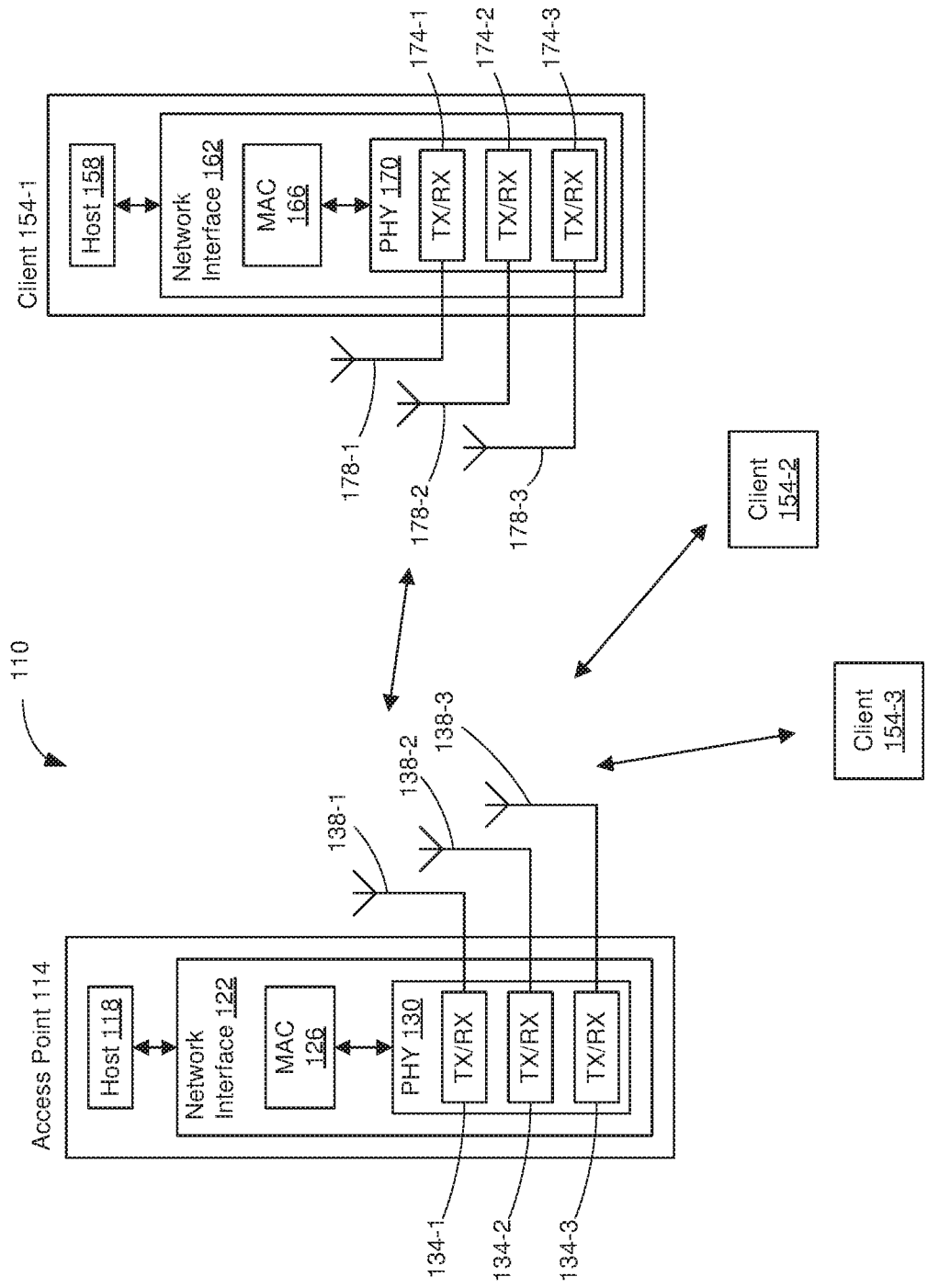
FIG. 1 is a block diagram of an example wireless local area network (WLAN), according to an embodiment.

FIG. 1 is a block diagram of an example WLAN 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2A:
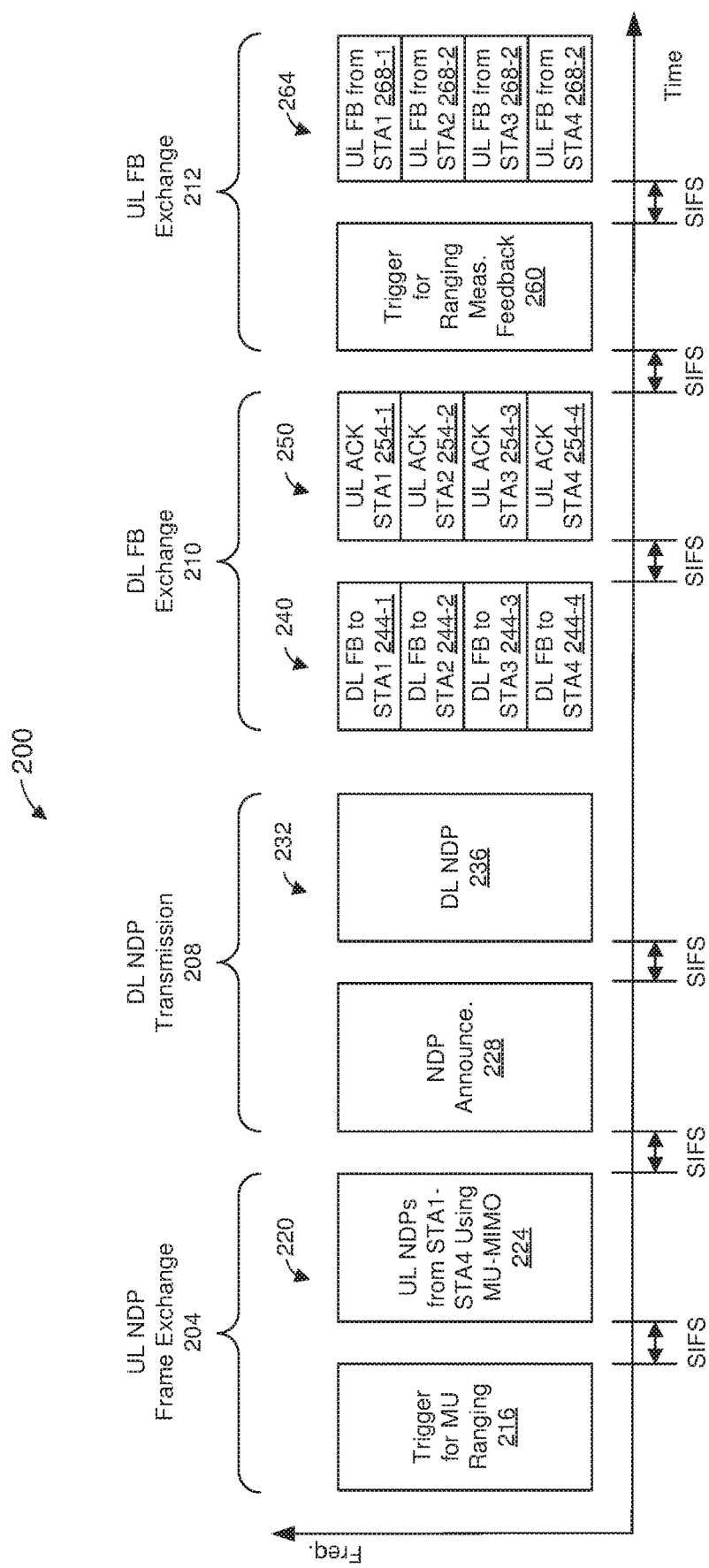
FIG. 2A is a diagram of an example multi-user (MU) ranging measurement exchange in an MU ranging measurement procedure, according to an embodiment.

FIG. 2A is a diagram of an example multi-user (MU) ranging measurement exchange 200 in an MU ranging measurement procedure, according to an embodiment. The diagram 200 is described in the context of the example network 110 merely for explanatory purposes. In some embodiments, signals illustrated in FIG. 2A are generated by other suitable communication devices in other suitable types of wireless networks.

The MU ranging measurement exchange 200 corresponds to an AP-initiated MU ranging measurement exchange, according to an embodiment. The MU ranging measurement exchange 200 includes an uplink (UL) null data packet (NDP) frame exchange 204, a downlink (DL) NDP transmission portion 208, a DL feedback (FB) frame exchange 210, and an UL FB frame exchange 212. In an embodiment, the uplink UL NDP frame exchange 204, the DL NDP transmission portion 208, the DL FB frame exchange 210, and the UL FB frame exchange 212 occur within a single transmit opportunity period (TXOP). In another embodiment, the uplink UL NDP frame exchange 204, the DL NDP transmission portion 208, the DL FB frame exchange 210, and the UL FB frame exchange 212 do not occur within a single TXOP. For example, the uplink UL NDP frame exchange 204 and the DL NDP transmission portion 208 occur within a single TXOP, whereas the DL FB frame exchange 210 and the UL FB frame exchange 212 occur after the single TXOP (e.g., in another TXOP or in multiple other TXOPs).

In the UL NDP exchange 204, a first communication device (e.g., the AP 114) transmits a DL PPDU 216 that includes a trigger frame to cause a group of multiple second communication devices (e.g., client stations 154) to simultaneously transmit, as part of an uplink (UL) MU transmission 220, UL null data packets (NDPs) 224. In an embodiment, the trigger frame in the PPDU 216 is a type of trigger frame specifically for initiating an MU ranging measurement exchange such as the MU ranging measurement exchange 200. The trigger frame in the PPDU 216 causes multiple client stations 154 to begin simultaneously transmitting the UL MU transmission 220 a defined time period after an end of the PPDU 216. In an embodiment, the defined time period is a short interframe space (SIFS) as defined by the IEEE 802.11 Standard. In other embodiments, another suitable time period is utilized.

In an embodiment, the UL MU transmission 220 includes an UL MU multiple input, multiple output (MIMO) transmission having two or more UL NDPs 224 from multiple client stations 154, e.g., STA1, STA2, STA3, and STA4. The two or more of the UL NDPs 224 are transmitted within a same frequency band via different spatial streams (e.g., MU-MIMO). In another embodiment, the UL MU transmission 220 includes an UL orthogonal frequency division multiple access (OFDMA) transmission having two or more UL NDPs 224 from multiple client stations 154, e.g., STA1, STA2, STA3, and STA4, in different respective frequency bandwidth portions. In yet another embodiment, three or more UL NDP packets 224 transmitted using a combination of UL MU-MIMO and UL OFDMA, where at least two NDPs are transmitted using MU-MIMO in a same frequency bandwidth portion via different spatial streams, and at least one NDP is transmitted in at least one other different frequency bandwidth portion. The UL NDPs 224 include PHY preambles having one or more short training fields (STFs), one or more long training fields (LTFs) and one or more signal fields, in an embodiment. The UL NDPs 224 omit data portions.

When transmitting the UL NDPs 224, each client station 154 records a time $t_{1,k}$ at which the client station 154 began transmitting the UL NDP 224, where k is an index indicating the particular client station 154. Similarly, when the AP 114 receives each UL NDP 224, the AP 114 records a time $t_{2,k}$ at which the AP 114 began receiving the UL NDP 224.

In some embodiments, when transmitting the UL NDPs 224, each of at least some of the client stations 154 (e.g., client stations 154 with multiple antennas 174) records an angle of departure, $AoD_{1,k}$, at which the UL NDP 224 left the antennas 178 of the client station 154. Similarly, when the AP 114 receives each UL NDP 224, the AP 114 records an angle of arrival, $AoA_{1,k}$, at which the UL NDP 224 arrived at the antennas 138 of the AP 114.

Figure 2B:
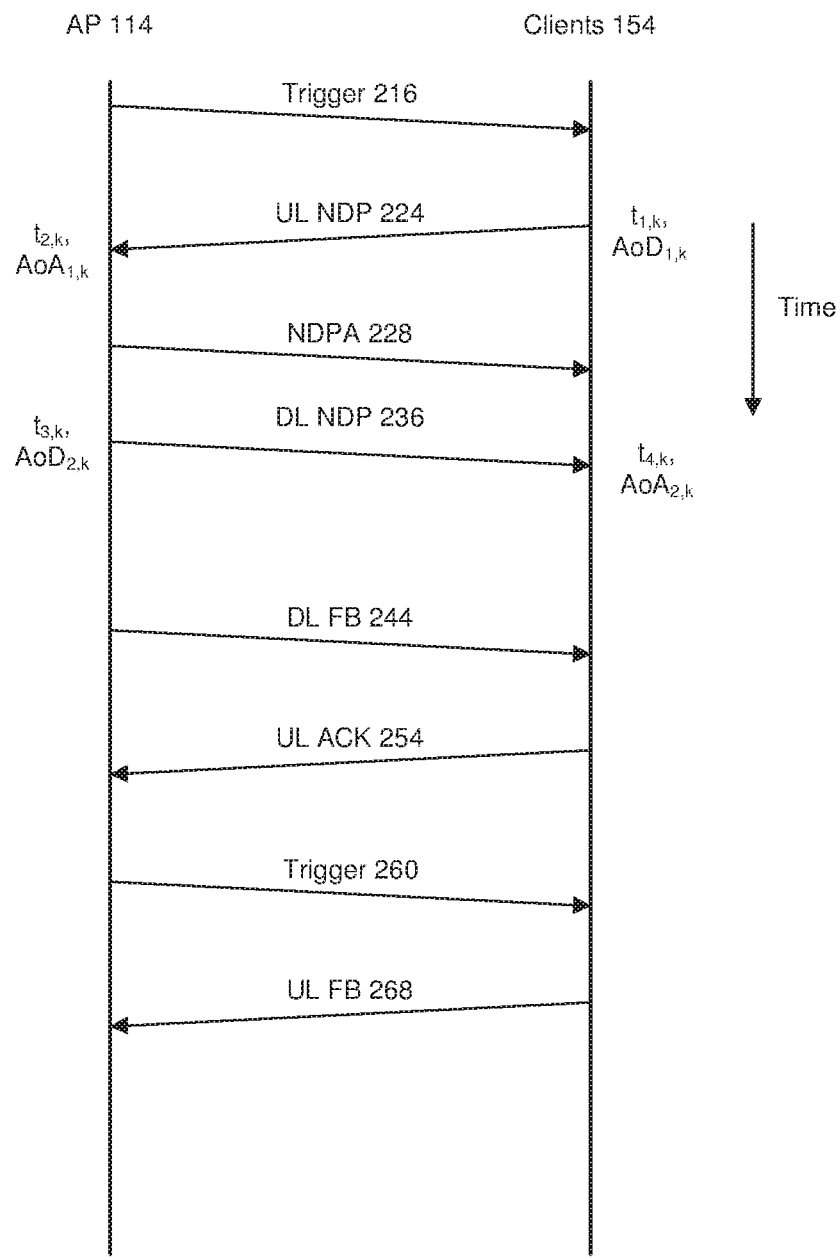
FIG. 2B is a timing diagram of the example MU ranging measurement exchange of FIG. 2A, according to an embodiment.

FIG. 2B is a timing diagram of the example MU ranging measurement exchange 200 of FIG. 2A. As illustrated in FIG. 2B, each client station 154 records the time $t_{1,k}$ at which the client station 154 began transmitting the UL NDP 224, and records the $AoD_{1,k}$ at which the UL NDP 224 left the antennas 178 of the client station 154. Additionally, the AP 114 records the time $t_{2,k}$ at which the AP 114 began receiving each UL NDP 224, and the $AoA_{1,k}$, at which each UL NDP 224 arrived at the antennas 138 of the AP 114.

Referring now to FIGS. 2A and 2B, responsive to the UL MU transmission 220, the AP 114 begins transmitting a DL PPDU 228 that includes an NDP announcement (NDPA) frame a defined time period after an end of the UL MU transmission 220. In an embodiment, the defined time period is SIFS. In other embodiments, another suitable time period is utilized. The NDPA frame in the PPDU 228 is configured to cause the client stations 154 to be prepared to receive an NDP from the AP 114, according to an embodiment.

The AP 114 generates a DL PPDU 232 and begins transmitting the DL PPDU 232 a defined time period after an end of the DL PPDU 228. In an embodiment, the defined time period is SIFS. In other embodiments, another suitable time period is utilized. The DL PPDU 232 is a MU PPDU that includes DL NDPs 236 to respective client stations 154. In another embodiment, the AP 114 transmits a single DL NDP 236 using a SU DL transmission (e.g., with a broadcast destination address) to the client stations 154. The DL NDP(s) 236 include PHY preamble(s) having one or more STFs, one or more LTFs and one or more signal fields, in an embodiment. The DL NDP(s) 236 omit data portions. In an embodiment, different DL NDPs 236 are transmitted in different frequency bandwidth portions (e.g., OFDMA). In some embodiments, two or more of the DL NDPs 236 are transmitted within a same frequency band (e.g., two or more of the DL NDPs 236 span the same frequency band) using different spatial streams (e.g., the two or more DL NDPs 236 are transmitted using MU-MIMO). In another embodiment, a single DL NDP 236 is broadcast to the client stations 154.

When transmitting the DL NDP(s) 236, the AP 114 records a time $t_{3,k}$ at which the AP 114 began transmitting the DL NDP(s) 236. Similarly, when each client station 154 receives the corresponding DL NDP 236, the client station 154 records a time $t_{4,k}$ at which the client station 154 began receiving the DL NDP 236. As illustrated in FIG. 2B, the AP 114 records the time $t_{3,k}$ at which the AP 114 began transmitting the DL NDP 236, and the client station 154 records the time $t_{4,k}$ at which the client station 154 began receiving the DL NDP 236.

In some embodiments, when transmitting the DL NDP 236, the AP 114 records an $AoD_{2,k}$ at which the DL NDP 236 left the antennas 138 of the AP 114. Similarly, when the client station 154 receives the DL NDP 236, the client station 154 records an $AoA_{2,k}$ at which the DL NDP 236 arrived at the antennas 178 of the client station 154.

In some embodiments, the MU ranging measurement exchange 200 omits the DL PPDU 228. For example, the AP 114 begins transmitting the DL PPDU 232 a defined time period after an end of the UL MU transmission 220. In an embodiment, the defined time period is SIFS. In other embodiments, another suitable time period is utilized.

The DL FB exchange 210 includes a DL PPDU 240 (which may be a DL OFDMA transmission or a DL MU-MIMO transmission) having FB frames 244 for multiple client stations 154, e.g., STA1, STA2, STA3, and STA4. The FB frames 244 are illustrated in FIG. 2A as being transmitted in different frequency bandwidth portions. In some embodiments, two or more of the FB frames 244 are transmitted within a same frequency band (e.g., two or more of the FB frames 244 span the same frequency band) using different spatial streams (e.g., the two or more FB frames 244 are transmitted using MU-MIMO).

In some embodiments, the DL PPDU 240 is transmitted a defined time period after an end of the DL PPDU 232. In an embodiment, the defined time period is SIFS. In other embodiments, another suitable time period is utilized. In other embodiments, the DL PPDU 240 is transmitted after some delay. As discussed above, in some embodiments, the DL PPDU 240 is not transmitted within a same TXOP as the DL PPDU 232.

The FB frames 244 respectively include the recorded times $t_{2,k}$ and $t_{3,k}$. In some embodiments, each of one or more FB frames 244 respectively includes (optionally) the recorded angles $AoA_{1,k}$ and $AoD_{2,k}$. In some embodiments, the FB frames 244 optionally also include respective channel estimate information determined by the AP 114 based on reception of the UL NDPs 224.

After receipt of the FB frames 244, one or more of the client stations 154 respectively calculate one or more respective of times-of-flight between the AP 114 and the one or more client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, one or more of the client stations 154 calculates estimated positions of one or more of the client stations using the calculated times-of-flight. For example, the client station 154-1 uses triangulation techniques to calculate an estimated positions of the client station 154-1 using the calculated time-of-flight. In some embodiments, the client station 154-1 calculates an estimated position of the client station also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining a position of the client station 154-1.

Responsive to receipt of the FB frames 244, the client stations 154 generate an UL MU transmission 250 (which may be an UL OFDMA transmission or an UL MU MIMO transmission) that includes respective ACK frames 254 from respective client stations, according to an embodiment. The client stations 154 transmit as part of the UL MU transmission 250 a defined time period after an end of the DL transmission 240. In an embodiment, the defined time period is SIFS. In other embodiments, another suitable time period is utilized. The ACK frames 254 are illustrated in FIG. 2A as being transmitted in different frequency bandwidth portions. In some embodiments, two or more of the ACK frames 254 are transmitted within a same frequency band (e.g., two or more of the ACK frames 254 span the same frequency band) using different spatial streams (e.g., the two or more ACK frames 254 are transmitted using MU-MIMO). In some embodiments, the client stations 154 do not generate and transmit the UL MU transmission 250 (e.g., the client stations 154 do not generate and transmit the AC frames 254).

In an embodiment, the AP 114 transmits a DL PPDU 260 a defined time period after an end of the UL MU transmission 250. In an embodiment, the defined time period is SIFS. In other embodiments, another suitable time period is utilized. The PPDU 260 includes a trigger frame to cause the group of client stations 154 to simultaneously transmit, as part of an UL MU transmission 264, uplink PPDUs 268 that include ranging measurement feedback. The trigger frame in the PPDU 260 causes multiple client stations 154 to begin simultaneously transmitting the UL MU transmission 264 a defined time period after an end of the PPDU 260. In an embodiment, the defined time period is SIFS. In other embodiments, another suitable time period is utilized.

The UL MU transmission 264 (which may be an UL OFDMA transmission or an UL MU-MIMO transmission) includes UL PPDUs 268 from multiple client stations 154, e.g., STA1, STA2, STA3, and STA4. The UL PPDUs 268 are illustrated in FIG. 2A as being transmitted in different frequency bandwidth portions. In some embodiments, two or more of the UL PPDUs 268 are transmitted within a same frequency band (e.g., two or more of the UL PPDUs 268 span the same frequency band) using different spatial streams (e.g., the two or more UL PPDUs 268 are transmitted using MU-MIMO).

The UL PPDUs 268 correspond to uplink ranging measurement feedback packets. The PPDUs 268 respectively include the recorded times $t_{1,k}$ and $t_{4,k}$. In some embodiments, each of one or more PPDUs 268 respectively includes (optionally) the recorded angles $AoD_{1,k}$ and $AoA_{2,k}$. In some embodiments, the PPDUs 268 optionally also include respective channel estimate information determined by the client station 154 based on reception of the DL NDP 236.

After receipt of the PPDUs 268, the AP 114 calculates respective of times-of-flight between the AP 114 and the client stations 154 using the recorded times $t_{1,k}$, $t_{2,k}$, $t_{3,k}$, and $t_{4,k}$, according to an embodiment. Any suitable technique, including currently known techniques, may be utilized to calculate a time-of-flight using the recorded times $t_{1,k}$, $t_{2,k}$, $t_{3,k}$, and $t_{4,k}$. Respective distances between the AP 114 and the client stations 154 may be calculated using the calculated times-of-flight, e.g., by respectively multiplying the times-of-flight by the speed of light, according to an embodiment.

In some embodiments, the AP 114 calculates estimated positions of one or more of the client stations using the calculated times-of-flight. For example, the AP 114 uses triangulation techniques to calculate estimated positions of one or more of the client stations using the calculated times-of-flight. In some embodiments, the AP 114 calculates estimated positions of one or more of the client stations also using the recorded angles $AoD_{1,k}$, $AoA_{1,k}$, $AoD_{2,k}$, and $AoA_{2,k}$. For example, the recorded angles $AoD_{1,k}$, $AoA_{1,k}$, $AoD_{2,k}$, and $AoA_{2,k}$ are used as part of a triangulation algorithm for determining positions of communication devices.

In another embodiment, the order, in time, of the DL FB exchange 210 and the UL FB exchange 212 is reversed, and the UL FB exchange 212 occurs before the DL FB exchange 210. In some embodiments, the DL FB exchange 210 is omitted. In some embodiments, the UL FB exchange 212 is omitted.

In some embodiments, the AP 114 assigns network identifiers (sometimes referred to herein as association identifiers (AIDs)) to client stations 154 upon the client stations 154 becoming associated with a basic service set (BSS) managed by the AP 114. For example, if a client station 154 requests to become associated with the BSS and the AP 114 determines that the client station 154 is permitted to become associated with the BSS, the AP 114 will assign an AID to the client station 154 and inform the client station 154 of the AID assigned to the client station. While the client station 154 is associated with the BSS, the AP 114 and the client station 154 use the AID in PPDUs and/or MPDUs exchanged between the AP 114 and associated client station 154. For example, when the associated client station 154 participates in the MU ranging measurement exchange 200, the AP 114 and the client station 154 use the AID in PPDUs and/or MPDUs exchanged during the MU ranging measurement exchange 200, such as in one of, or any suitable combination of two or more of, i) the PPDU 216 and/or the trigger frame within the PPDU 216, ii) one of the UL NDPs 224, iii) the PPDU 228 and/or the NDP announcement frame within the PPDU 228, iv) the DL NDP 236, v) one of the DL FB PPDUs 244 and/or an MPDU within the DL FB PPDU 244, vi) one of the UL ACKs 254, vii) the PPDU 260 and/or the trigger frame within the PPDU 260, and viii) one of the UL FB PPDUs 268 and/or an MPDU within the UL FB PPDU 268.

The AP 114, however, sometimes performs a ranging measurement exchange with one or more client stations 154 that are not associated with the BSS (sometimes referred to as "unassociated client stations"), in some embodiments. Thus, the AP 114 assigns preliminary AIDs (pre-AIDs) to at least some unassociated client stations 154 prior to the MU ranging measurement exchange 200, according to some embodiments. When the unassociated client station 154 participates in the MU ranging measurement exchange 200, the AP 114 and the unassociated client station 154 use the pre-AID in PPDUs and/or MPDUs exchanged during the MU ranging measurement exchange 200, such as in one of, or any suitable combination of two or more of, i) the PPDU 216 and/or the trigger frame within the PPDU 216, ii) one of the UL NDPs 224, iii) the PPDU 228 and/or the NDP announcement frame within the PPDU 228, iv) the DL NDP 236, v) one of the DL FB PPDUs 244 and/or an MPDU within the DL FB PPDU 244, vi) one of the UL ACKs 254, vii) the PPDU 260 and/or the trigger frame within the PPDU 260, and viii) one of the UL FB PPDUs 268 and/or an MPDU within the UL FB PPDU 268.

In an embodiment, the AP 114 assigns both i) AIDs to associated client stations 154 and ii) pre-AIDs to unassociated client stations from a same set of AID values (e.g., the set includes values 1-2007, or another suitable range of values), such that no two client stations 154 are assigned a same value of an AID or pre-AID. For example, when a value in the set is currently assigned as an AID or a pre-AID to a client station 154, the AP 114 will not assign the same value to another client station 154 as an AID or a pre-AID. In such embodiments, a ranging measurement session can involve both associated client stations 154 and unassociated client stations 154. In an embodiment, a first subset of values in the set is reserved for associated client stations, and the AP 114 assigns AIDs to associated client stations 154 from the first subset; and a second subset of values (which does not overlap with the first subset) in the set is reserved for unassociated client stations, and the AP 114 assigns pre-AIDs to unassociated client stations 154 from the second subset.

In another embodiment, the AP 114 is permitted to reuse an AID value for a currently associated client station 154 as a pre-AID for an unassociated client station 154. In such an embodiment, a ranging measurement sessions such as described herein are performed separately for association client stations 154 and unassociated client stations 154, such that a ranging measurement sessions involves i) only associated client stations 154, or ii) only unassociated client stations 154.

In an embodiment, the AP 114 includes the pre-AID in an MPDU one or more of the DL transmissions illustrated in FIG. 2A. For example, the trigger frame 216 includes a plurality of user information fields (user info fields) corresponding to client stations 154 that are to participate in the UL MU transmission 220. For instance, one of the user inform fields identifies (e.g., by including the pre-AID in the user info field) that the unassociated client station 154 is to transmit an NDP as part of the UL MU transmission 220, according to an embodiment. Additionally, the user info field that includes the pre-AID also indicates on which one or more spatial streams the unassociated client station 154 is to transmit an NDP as part of the UL MU transmission 220, according to an embodiment.

In an embodiment, the AP 114 includes the pre-AID in a PHY preamble one or more of the DL transmissions illustrated in FIG. 2A. For example, the PPDU 260 includes a signal field (e.g., a high efficiency WiFi (HE) signal field B (HE-SIGB), where the HE-SIGB field includes a plurality of user info fields corresponding to a plurality of client stations 154 that are to participate in the MU UL transmission 264, and where each user info field includes a respective AID or pre-AID. In an embodiment, the relative positions of the user info fields within the HE-SIGB indicate (in conjunction with other information in the HE-SIGB (e.g., resource unit (RU) allocation information in a common information field)) in which frequency block each client station 154 is to transmit as part of the MU UL transmission 264. Additionally, the user info field that includes the pre-AID also indicates on which one or more spatial streams the unassociated client station 154 is to transmit as part of the UL MU transmission 264, according to an embodiment.

Similarly, as another example, the PPDU 240 includes an HE-SIGB field with a plurality of user info fields corresponding to a plurality of client stations 154 that are to participate in the MU UL transmission 250, and where each user info field includes a respective AID or pre-AID, according to an embodiment.

Figure 3:
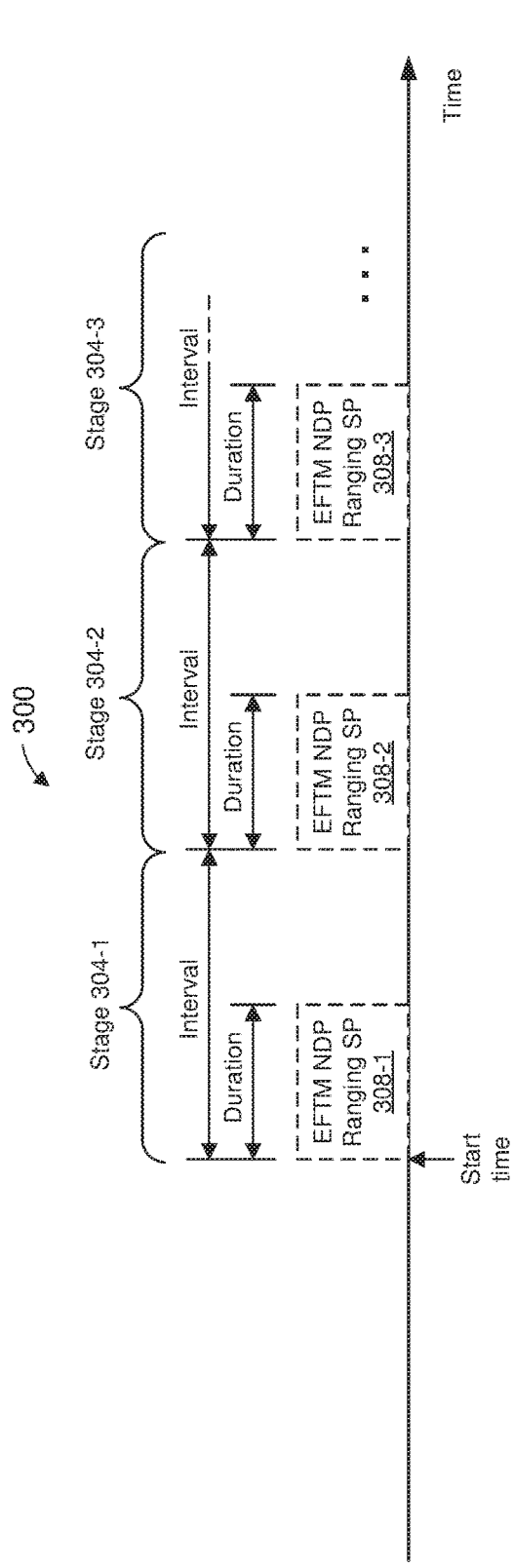
FIG. 3 is a timing diagram of an example MU ranging measurement procedure, according to an embodiment.

FIG. 3 is a timing diagram of an example MU ranging measurement procedure 300, according to an embodiment. The diagram of FIG. 3 is described in the context of the example network 110 merely for explanatory purposes. In some embodiments, signals illustrated in FIG. 3 are generated by other suitable communication devices in other suitable types of wireless networks.

The MU ranging measurement procedure 300 begins at a start time and includes a plurality of stages 304. In an embodiment, the AP 114 performs one or more MU ranging measurement exchanges, and optionally one or more single-user (SU) ranging measurement exchanges, with different sets of client stations 154 in the stages 304. Each stage 304 includes a time slot 308 (sometimes referred to herein as an enhanced fine timing measurement (EFTM) service period (SP)). In an embodiment, a first time slot 308-1 begins at the start time of the MU ranging measurement procedure 300. The time slots 308 occur at an interval.

The AP 114 schedules a set of client stations 154 to participate in one or more ranging measurement exchanges (e.g., the MU ranging measurement exchange 200 of FIG. 2A or another suitable MU ranging measurement exchange) during each stage 304. If only one client station 154 is scheduled to participate during a particular stage 304, the AP 114 and the one client station 154 participate in an SU ranging measurement exchange, according to an embodiment.

In an embodiment, within each of one or more of the time slots 308, the AP 114 transmits to client stations 154 one or more packets (sometimes referred to herein as "scheduling packets") that indicates which set of client stations 154 are to participate in the one or more ranging measurement exchanges in the corresponding stage 304. If a client station 154 determines, based on receiving the one or more scheduling packets during a time slot 308, that the client station 154 is not to participate in a ranging measurement exchange during the corresponding stage 304, the network interface device 162 of the client station 154 is permitted to transition to a low power state (sometimes referred to herein as a sleep state) upon an end of the time slot 308, according to an embodiment. For example, the network interface device 162 is permitted to transition to the low power state at the end of the time slot 308 and to remain in the low power state until a beginning of the next time slot 308 in the next stage 304. Prior to a beginning of the next time slot 308, the network interface device 162 transitions to an active state so that the network interface device 162 is ready to receive from the AP 114 within the next time slot 308 the one or more scheduling packets that indicates which set of client stations 154 are to participate in the one or more ranging measurement exchanges in the next stage 304.

In some embodiments, one or more scheduling packets include one or more pre-AIDs of one or more unassociated client station 154, wherein the AP 114 includes a pre-AID in a scheduling packet to indicate to the unassociated client station 154 in which time slot(s) 308 the unassociated client station 154 is to participate in the MU ranging measurement exchange 200 of FIG. 2A or another suitable MU ranging measurement exchange.

To facilitate an MU ranging measurement procedure such as the MU ranging measurement procedure 300 discussed above, the AP 114 communicates to the client stations 154 an indication of a start time of the MU ranging measurement procedure, an indication of an interval of the stages of the MU ranging measurement procedure, and an indication of a duration of each time slot, according to some embodiments.

In some embodiments, when the AP 114 assigns a pre-AID to an unassociated client station 154, the pre-AID becomes invalid for unassociated client station 154 after the end of the MU ranging measurement procedure 300. Thus, the AP 114 will no longer recognize the pre-AID as corresponding to the unassociated client station 154 after the end of the MU ranging measurement procedure 300, according to an embodiment. In some embodiments, the MU ranging measurement procedure 300 is ended by the client station 154 terminating the MU ranging measurement procedure 300 or the AP 114 terminating the MU ranging measurement procedure 300.

In some embodiments, the AP 114 transmits a plurality of SU packets to a plurality of client stations 154 prior to an MU ranging measurement procedure 300 to provide the plurality of client stations 154 with information regarding the MU ranging measurement procedure 300. For example, in an embodiment, the AP 114 transmits respective SU packets to respective client stations 154 prior to an MU ranging measurement procedure 300, where each SU packet includes an indication of the start time of the MU ranging measurement procedure, an indication of an interval of the stages of the MU ranging measurement procedure, and an indication of a duration of each time slot. In some embodiments, one or more of the SU packets also include respective pre-AID(s) assigned to one or more unassociated client stations 154.

Figure 4:
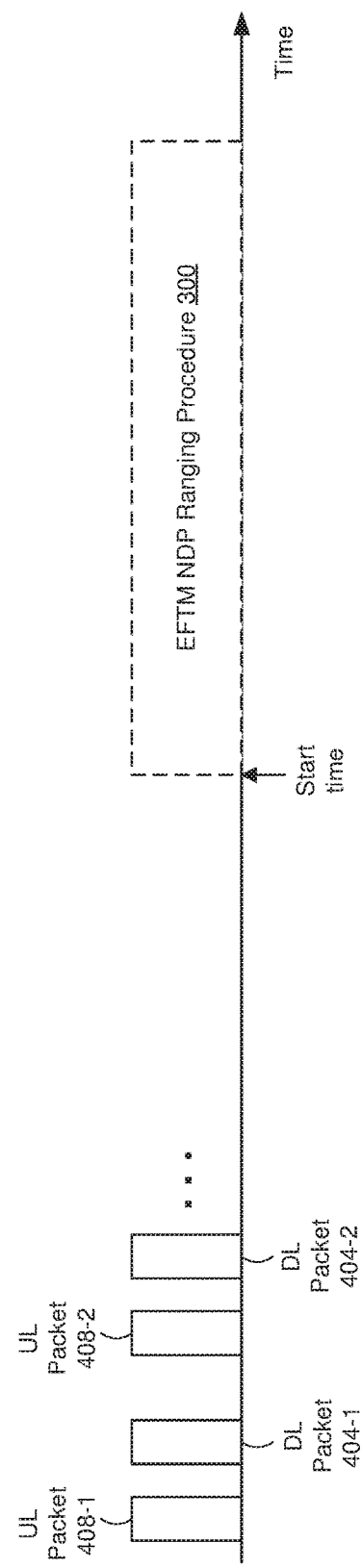
FIG. 4 is a timing diagram of an example MU ranging measurement procedure, according to an embodiment.

FIG. 4 is a timing diagram of an example transmission exchange 400 in which the AP 114 transmits a plurality of SU packets to a plurality of client stations 154 prior to the MU ranging measurement procedure 300 to provide the plurality of client stations 154 with information regarding the MU ranging measurement procedure 300, according to an embodiment. The diagram of FIG. 4 is described in the context of the example network 110 merely for explanatory purposes. In some embodiments, signals illustrated in FIG. 4 are generated by other suitable communication devices in other suitable types of wireless networks.

The network interface device 122 of the AP 114 generates a plurality of packets 404, each packet 404 corresponding to a respective client station 154. Each packet 404 includes an MPDU (e.g., a management frame) having information regarding the MU ranging measurement procedure 300, according to an embodiment. The network interface device 122 of the AP 114 transmits each packet 404 as an SU transmission to a respective client station 154, according to an embodiment.

In an embodiment, each packet 404 is transmitted in response to the network interface device 122 of the AP 114 successfully receiving a packet 408 from the corresponding client station 154.

In an embodiment, the packet 408 includes a request frame (sometimes referred to herein as an "EFTM request frame") corresponding to an MU ranging measurement exchange, such as the example MU ranging measurement exchange 200 of FIG. 2A. In an embodiment, the EFTM request frame includes an indication that the client station 154 seeks to perform a ranging measurement exchange with the AP 114. In some embodiments, the EFTM request frame also includes capability information regarding the types of feedback information the client station 154 can provide. In some embodiment, the AP 114 transmits an ACK frame (not shown) a suitable time period (e.g., SIFS) after an end of reception of the packet 408 to acknowledge the reception of the packet 408.

In some embodiments in which the packet 408 includes an EFTM request frame, the packet 404 includes a response frame (sometimes referred to herein as an "EFTM response frame") corresponding to an MU ranging measurement exchange, such as the example MU ranging measurement exchange 200 of FIG. 2A. In an embodiment, the EFTM response frame is responsive to the EFTM request frame discussed above and indicates that the AP 114 will participate in a ranging measurement exchange with the client station. In an embodiment, the EFTM response frame includes information regarding the MU ranging measurement procedure 300 (e.g., one or more of an indication of a start time of the MU ranging measurement procedure 300, an indication of an interval of the stages 304 of the MU ranging measurement procedure 300, the indication of the duration of each time slot 308 of the MU ranging measurement procedure 300, etc.), according to an embodiment. In some embodiment, the client station 154 transmits an ACK frame (not shown) a suitable time period (e.g., SIFS) after an end of reception of the packet 404 to acknowledge the reception of the packet 404.

In an embodiment, in response to receiving a packet 408 from an unassociated client station 154, the AP 114 assigns a pre-AID to the unassociated client station 154. Additionally, the AP 114 includes the assigned pre-AID in the packet 404 (e.g., in the EFTM request frame) to inform the unassociated client station 154 that the AP 114 has assigned the pre-AID to the unassociated client station 154 for use during the MU ranging measurement procedure 300. In an embodiment, the packet 404 includes the pre-AID assigned to the unassociated client station 154. For example, the EFTM response frame in the packet 404 includes the pre-AID assigned to the unassociated client station 154.

FIG. 5A is a diagram of an example information element 500 that indicates an assignment of a pre-AID to an unassociated client station 154, according to an embodiment. The information element 500 is included in the packet 404 (FIG. 4), according to an embodiment. For example, the information element 500 is included in the EFTM response frame in the packet 404. In other embodiments, the information element 500 is included in another suitable packet and/or frame. Similarly, in some embodiments, the EFTM response frame and/or the packet 404 include the pre-AID assigned to the unassociated client station 154 within another suitable information element and/or MAC frame different than the example information element 500.

FIG. 5A illustrates examples number of bits for various fields of the information element 500 merely for illustrative purposes. In other embodiments, one or more fields have different suitable numbers of bits. FIG. 5A illustrates an example arrangement of fields within the information element 500 merely for illustrative purposes. In other embodiments, the fields of the information element 500 are arranged in different suitable manners. In some embodiments, one or more of the fields illustrated in FIG. 5A are omitted, and/or additional fields are included in the information element.

The information element 500 includes an element identifier (ID) field 504 and an element ID extension field 508 that includes respective values that identify the information element 500 as being an information element that indicates an assignment of a pre-AID to a client station 154 (e.g., to an unassociated client station 154). In an embodiment, a wireless communication protocol specifies a plurality of different information elements, and the element ID field 504 and optionally the element ID extension field 508 indicate a particular information element among the plurality of different information elements. In an embodiment, different information elements have respective formats, and the respective values of the element ID field 504 and the element ID extension field 508 thus indicate that the information element 500 has the format illustrated in FIG. 5A (or another suitable format). In some embodiments, the element ID extension field 508 is omitted, and the value of the element ID field 504 identifies the information element 500 as being an information element that indicates an assignment of a pre-AID to a client station 154 (e.g., to an unassociated client station 154), and that the information element 500 has the format illustrated in FIG. 5A (with the element ID extension field 508 omitted).

The information element 500 also includes a length field 512, which indicates a length of the information element 500. In another embodiment, the length field 512 is omitted. For example, the length of the information element 500 is defined by the wireless communication protocol, and thus a communication device that receives the information element 500 determines the length of the information element 500 based on the value(s) of the element ID field 504 and optionally the element ID extension field 508, according to an embodiment.

The information element 500 further includes a pre-AID field 516 that includes a value of the pre-AID being assigned to the client station 154 (e.g., to an unassociated client station 154). In an embodiment, the information element 500 is included in a unicast MAC data unit (e.g., a unicast EFTM response frame, a unicast MPDU, or another suitable unicast MAC data unit), where the MAC data unit includes a unicast MAC address of the client station 154 (e.g., in a destination address field in a MAC header of the MAC data unit) to which the pre-AID is being assigned, and thus the client station 154 determines, based on the information element being in a unicast MAC data unit having a MAC address of the client station 154, that the pre-AID in the pre-AID field 516 is being assigned to the client station 154.

FIG. 5B is a diagram of another example information element 550 that indicates an assignment of a pre-AID to an unassociated client station 154, according to an embodiment. The information element 550 is included in the packet 404 (FIG. 4), according to an embodiment. For example, the information element 550 is included in the EFTM response frame in the packet 404. In other embodiments, the information element 550 is included in another suitable packet and/or frame. Similarly, in some embodiments, the EFTM response frame and/or the packet 404 include the pre-AID assigned to the unassociated client station 154 within another suitable information element and/or MAC frame different than the example information element 550.

FIG. 5B illustrates examples number of bits for various fields of the information element 550 merely for illustrative purposes. In other embodiments, one or more fields have different suitable numbers of bits. FIG. 5B illustrates an example arrangement of fields within the information element 550 merely for illustrative purposes. In other embodiments, the fields of the information element 550 are arranged in different suitable manners. In some embodiments, one or more of the fields illustrated in FIG. 5B are omitted, and/or additional fields are included in the information element.

The information element 550 is similar to the information element 500 of FIG. 5A, and like-numbered elements are not described in detail for purposes of brevity.

The information element 550 includes an address present field 554 which indicates whether the information element 550 includes a MAC address field 560. For example, when the information element 550 is included in a unicast MAC data unit, the MAC address field 560 is omitted and the address present field 554 is set to a value to indicate that the MAC address field 560 is not included in the information element 550. In some embodiments, when the information element 550 is included in a broadcast packet (e.g., the packet includes a MAC data unit with a destination address in a MAC header set to a broadcast address), or in a group-addressed packet (e.g., the packet includes a MAC data unit with a destination address in a MAC header set to a multicast address which corresponds to a group of multiple communication devices), the MAC address field 560 is included in the information element 550 and the address present field 554 is set to a value to indicate that the MAC address field 560 is included.

In an embodiment, when the information element 550 includes the MAC address field 560, an unassociated client station 154 receiving the information element 550 determines, based on whether the MAC address in the field 560 is the MAC address of the unassociated client station 154, whether the pre-AID in the pre-AID field 516 is being assigned to the unassociated client station 154. If the unassociated client station 154 determines that the MAC address in the field 560 is the MAC address of the unassociated client station 154, then the unassociated client station 154 determines that the pre-AID in the pre-AID field 516 is being assigned to the unassociated client station 154.

In some embodiments, the information element 500 and/or the information element 550 includes a field (not shown) that indicates an end time at which the pre-AID is no longer valid for the unassociated client station 154. In some embodiments, the information element 500 and/or the information element 550 includes a field (not shown) that indicates a start time at which the pre-AID becomes valid for the unassociated client station 154.

Figure 6:
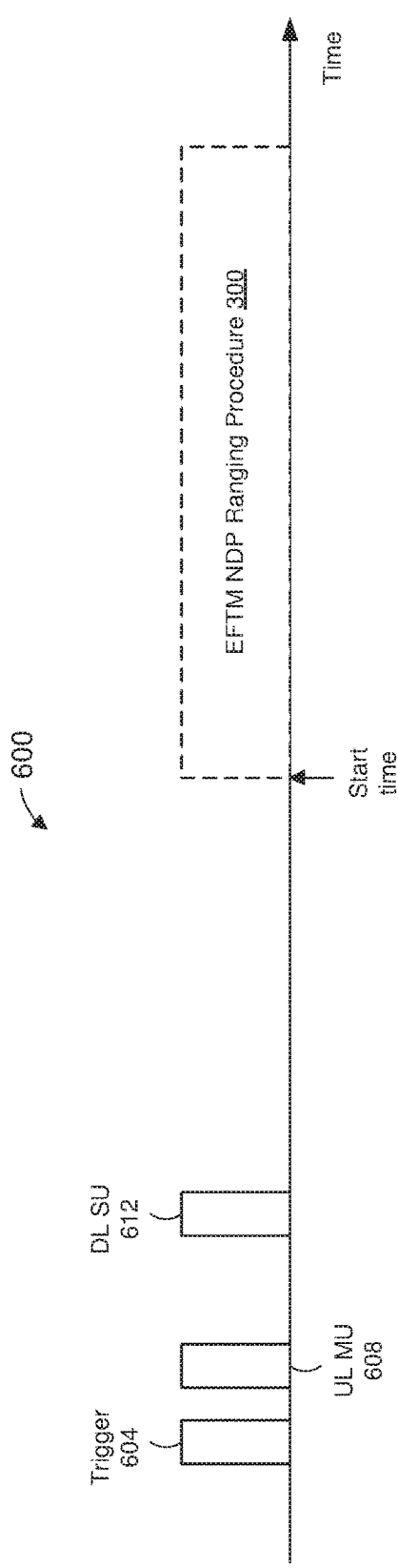
FIG. 6 is a timing diagram of another example MU ranging measurement procedure, according to another embodiment.

FIG. 6 is a timing diagram of an example transmission exchange 600 in which the AP 114 performs an MU transmission a plurality client stations 154 prior to the MU ranging measurement procedure 300 that provides one or more unassociated client stations 154, among the plurality of client stations 154, with one or more respective pre-AIDs assigned to the one or more unassociated client stations 154 for use during the MU ranging measurement procedure 300, according to an embodiment. The diagram of FIG. 6 is described in the context of the example network 110 merely for explanatory purposes. In some embodiments, signals illustrated in FIG. 6 are generated by other suitable communication devices in other suitable types of wireless networks.

The network interface device 122 of the AP 114 generates a downlink (DL) PPDU 604 having a trigger frame configured to prompt a plurality of client stations 154 to transmit as part of an uplink (UL) MU transmission 608 (e.g., an UL orthogonal frequency division multiple access (OFDMA) transmission and/or an UL MU-multiple-input-multiple-output (MU-MIMO) transmission). In an embodiment, the trigger frame in the DL PPDU 604 includes information that prompts client stations 154 that want to participate in a ranging measurement procedure to provide, in the UL MU transmission 608, requests to participate in the ranging measurement procedure. The network interface device 122 of the AP 114 then transmits the DL PPDU 604.

In an embodiment, the AP 114 (e.g., the network interface device 122) allocates resource units (RUs) (e.g., blocks of OFDM tones) for unassociated client stations 154 to participate in the UL MU transmission 608 via contention-based OFDMA transmissions, and the network interface device 122 includes in the trigger frame in the DL PPDU 504 an indication that particular RUs have been allocated for contention-based OFDMA transmissions. For example, the network interface device 122 allocates one or blocks of one or more RUs, and includes in a common information field of the trigger frame an indication of the allocated one or more blocks of RU(s). Additionally, the network interface device 122 includes, for each allocated block of RU(s), a user information field having an AID field that indicates an AID to which the block of RU(s) has been allocated. For each block of RU(s) allocated for use by unassociated client stations 154, the network interface device 122 includes in the AID field of the corresponding user information field a reserved AID value, where the reserved AID value indicates the block of RU(s) is reserved for contention-based OFDMA transmissions. In an embodiment, the reserved AID value indicates the block of RU(s) is reserved for contention-based OFDMA transmissions by unassociated client station 154. In some embodiments, the AP 114 (e.g., the network interface device 122) generates the trigger frame in the DL PPDU 504 and the unassociated client stations 154 participate in the UL MU transmission 608 according to random access OFDMA technique such as described in draft 2.2 of the IEEE 802.11ax Standard, dated February 2018.

In an embodiment, the trigger frame in the DL PPDU 604 includes information that indicates the trigger frame in the DL PPDU 604 is soliciting requests to participate in a ranging measurement procedure. In an embodiment, the trigger frame includes a trigger type subfield having information indicating that the trigger frame 604 is a type of trigger frame specifically for soliciting requests to participate in a ranging measurement procedure, such as the MU ranging measurement exchange 200, and/or the ranging measurement procedure 300. In an embodiment, the value of the trigger type subfield is selected from among a plurality of values corresponding to a plurality of trigger variants defined by a communication protocol (e.g., the IEEE 802.11 Standard). Different trigger variants correspond to different type of information being solicited in an UL MU transmission and/or the UL MU transmission being part of different types of procedures, in some embodiments. In an illustrative embodiment, the plurality of trigger variants defined by the communication protocol include any suitable combination of two or more of the following: i) a basic trigger for soliciting an UL MU transmission having basic user data from communication devices, ii) a beamforming report poll trigger for soliciting an UL MU transmission having beamforming training feedback from communication devices, iii) an MU request-to-send trigger for soliciting an UL MU transmission having clear-to-send (CTS) frames from communication devices, iv) a buffer status report poll (BSRP) trigger for soliciting an UL MU transmission having information regarding how much user data communication devices have to send to the AP 114, v) a trigger for soliciting requests to participate in a ranging measurement procedure, etc.

In another embodiment, the trigger frame in the DL PPDU 604 includes a common information field, with a subfield having information that indicates the trigger frame in the DL PPDU 604 is soliciting requests to participate in a ranging measurement procedure.

In response to the DL PPDU 604, a plurality of client stations 154 simultaneously transmit as part of the UL MU transmission 608 (e.g., an UL OFDMA transmission and/or an UL MU-MIMO transmission). The UL MU transmission 608 includes requests by client stations 154 to participate in a ranging measurement procedure. The network interface device 122 of the AP 114 analyzes the requests to participate in the ranging measurement procedure.

In an embodiment, one or more unassociated client stations 154 transmits requests to participate in a ranging measurement procedure in RU(s) allocated by the AP 114 for contention-based OFDMA transmissions as part of the UL MU transmission 608. For example, unassociated client stations 154 randomly or pseudorandomly select RUs that have been allocated by the AP 114 for contention-based transmissions, and then transmit requests via the selected RUs as part of the UL MU transmission 608. If multiple unassociated client stations 154 select the same RU and thus transmit requests within the same RU, a collision will result and the AP 114 likely will not correctly receive any of transmissions of the unassociated client stations 154 transmitted via the same RU.

The network interface device 122 of the AP 114 processes the UL MU transmission 608 to determine which client station 154 are requesting to participate in a ranging measurement procedure. For requests to participate received from unassociated client stations 154, the network interface device 122 assigns respective pre-AIDs to the unassociated client stations 154.

In an embodiment, the network interface device 122 of the AP 114 generates a DL SU PPDU 612 that includes a broadcast frame with information corresponding to an MU ranging measurement procedure, such as the example MU ranging measurement procedure 300 of FIG. 3. For example, in an embodiment, the information corresponding to the MU ranging measurement procedure includes an indication of a start time of the MU ranging measurement procedure 300, an indication of an interval of the stages of the MU ranging measurement procedure 300, and an indication of the duration of each time slot 308 of the MU ranging measurement procedure 300.

Additionally, the information corresponding to an MU ranging measurement procedure also includes pre-AIDs assigned to respective unassociated client stations 154. Upon receiving the DL SU PPDU 612, at least some unassociated client stations 154 (e.g., unassociated client stations 154 whose requests in the UL MU 608 transmission were correctly received by the AP 114) process the DL SU PPDU 612 to determine information regarding an upcoming MU ranging measurement procedure, including respective pre-AIDs assigned to the unassociated client stations 154 for the upcoming MU ranging measurement procedure.

In some embodiments, the network interface device 122 of the AP 114 generates and transmits a DL MU PPDU instead of the DL SU PPDU 612, wherein the DL MU PPDU includes the information corresponding to the MU ranging measurement procedure discussed above.

Figure 7:
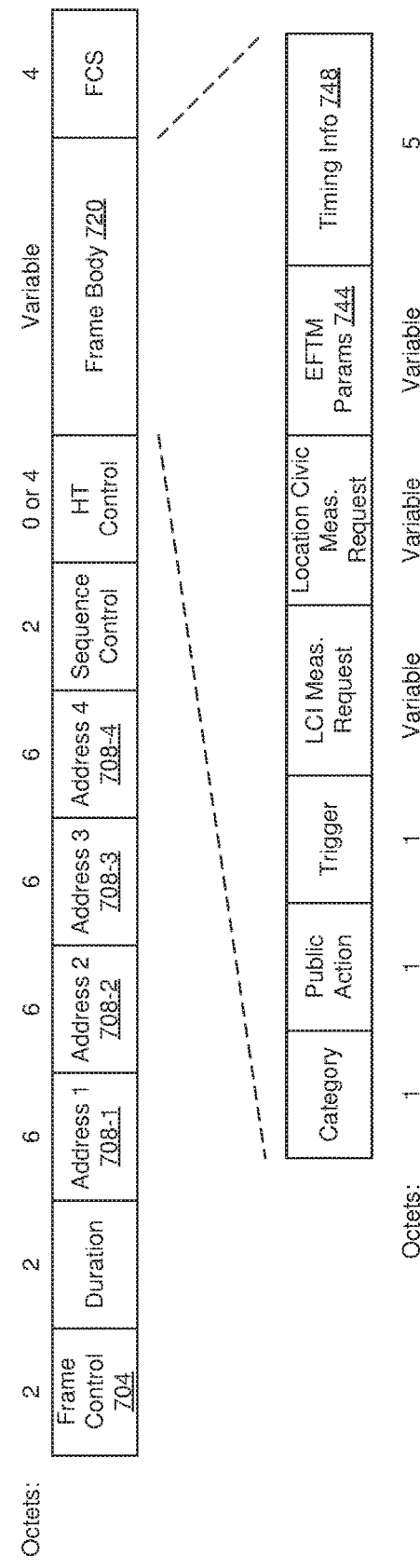
FIG. 7 is an example frame format of a request frame regarding an MU ranging measurement procedure, according to an embodiment.

FIG. 7 is a diagram of an example request frame 700 (sometimes referred to herein as an "EFTM request frame") that client stations 154 transmit as part of the UL MU transmission 608, according to an embodiment. In other embodiments, the request frame 700 is included in another suitable single-user or multi-user transmission.

FIG. 7 illustrates examples number of octets for various fields of the request frame 700 merely for illustrative purposes. In other embodiments, one or more fields have different suitable numbers of bits. FIG. 7 illustrates an example arrangement of fields within the request frame 700 merely for illustrative purposes. In other embodiments, the fields of the request frame 700 are arranged in different suitable manners. In some embodiments, one or more of the fields illustrated in FIG. 7 are omitted, and/or additional fields are included in the request frame.

The request frame 700 includes a frame control field 704 set to a value to indicate that the frame 700 corresponds to a request to participate in a ranging measurement procedure.

The request frame 700 also includes a plurality of address fields 708, where one of the address fields 708 indicates a MAC address of the AP 114 (e.g., a receiver address) and another one of the address fields 708 indicates a MAC address of the client station 154 (e.g., a transmitter address) that is transmitting the request frame 700.

The request frame 700 also includes a frame body 720. The frame body 720 includes a plurality of fields, including a field 744 that includes information regarding ranging measurement procedures. For example, the field 744 includes capability information regarding capabilities of the client station 154 with respect to participating in a ranging measurement procedure, according to an embodiment.

Figure 8A:
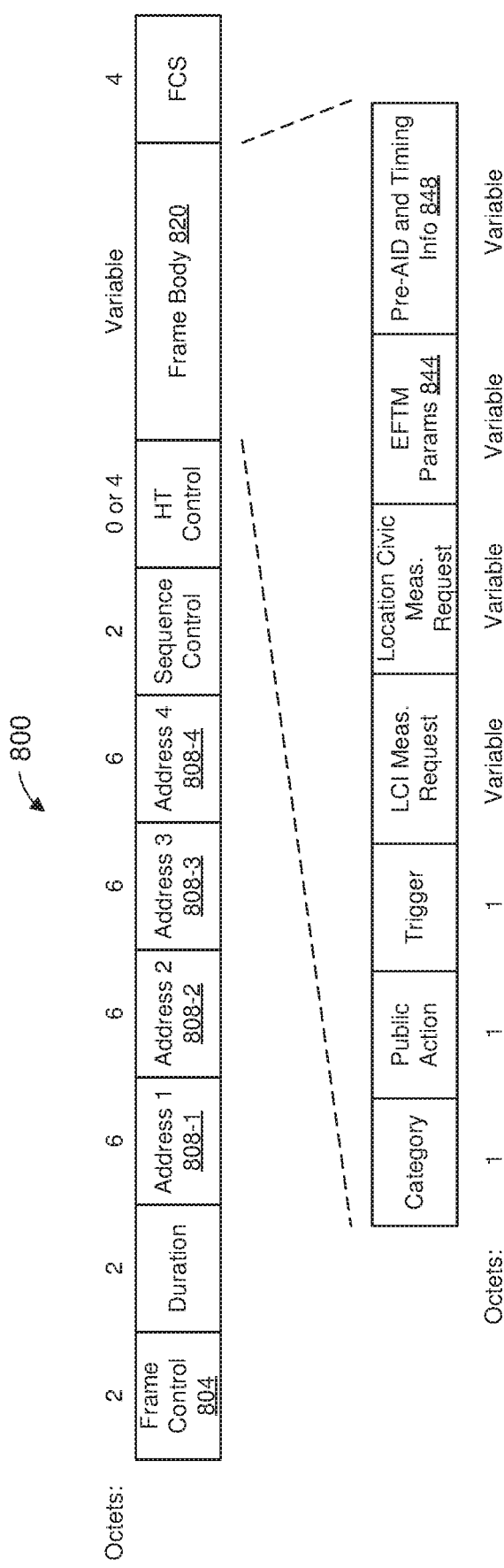
FIG. 8A is an example frame format of a response frame regarding an MU ranging measurement procedure, according to an embodiment.

FIG. 8A is a diagram of an example response frame 800 (sometimes referred to herein as an "EFTM response frame") that the AP 114 transmits as part of the DL SU transmission 612, according to an embodiment. In other embodiments, the response frame 800 is included in another suitable single-user or multi-user transmission.

FIG. 8A illustrates examples number of octets for various fields of the response frame 800 merely for illustrative purposes. In other embodiments, one or more fields have different suitable numbers of bits. FIG. 8A illustrates an example arrangement of fields within the response frame 800 merely for illustrative purposes. In other embodiments, the fields of the response frame 800 are arranged in different suitable manners. In some embodiments, one or more of the fields illustrated in FIG. 8A are omitted, and/or additional fields are included in the response frame.

The response frame 800 includes a frame control field 804 set to a value to indicate that the frame 800 corresponds to a response to one or more requests to participate in a ranging measurement procedure.

The response frame 800 also includes a plurality of address fields 808, where one of the address fields 808 indicates a broadcast MAC address (e.g., a receiver address) and another one of the address fields 808 indicates a MAC address of the AP 114 (e.g., a transmitter address), which is transmitting the response frame 800.

The response frame 800 also includes a frame body 820. The frame body 820 includes a plurality of fields, including a field 844 that includes information regarding an upcoming ranging measurement procedure. For example, in an embodiment, the field 844 includes capability information regarding capabilities of the AP 114 with respect to participating in a ranging measurement procedure. The frame body 820 includes a field 848, which includes timing information regarding an upcoming ranging measurement procedure. For example, in an embodiment, the timing information regarding the ranging measurement procedure includes an indication of a start time of the MU ranging measurement procedure 300, an indication of an interval of the stages of the MU ranging measurement procedure 300, and an indication of the duration of each time slot 308 of the MU ranging measurement procedure 300.

Additionally, the field 848 includes information indicating an assignment of one or more pre-AIDs to one or more respective unassociated client stations 154 for the upcoming ranging measurement procedure.

Figure 8B:
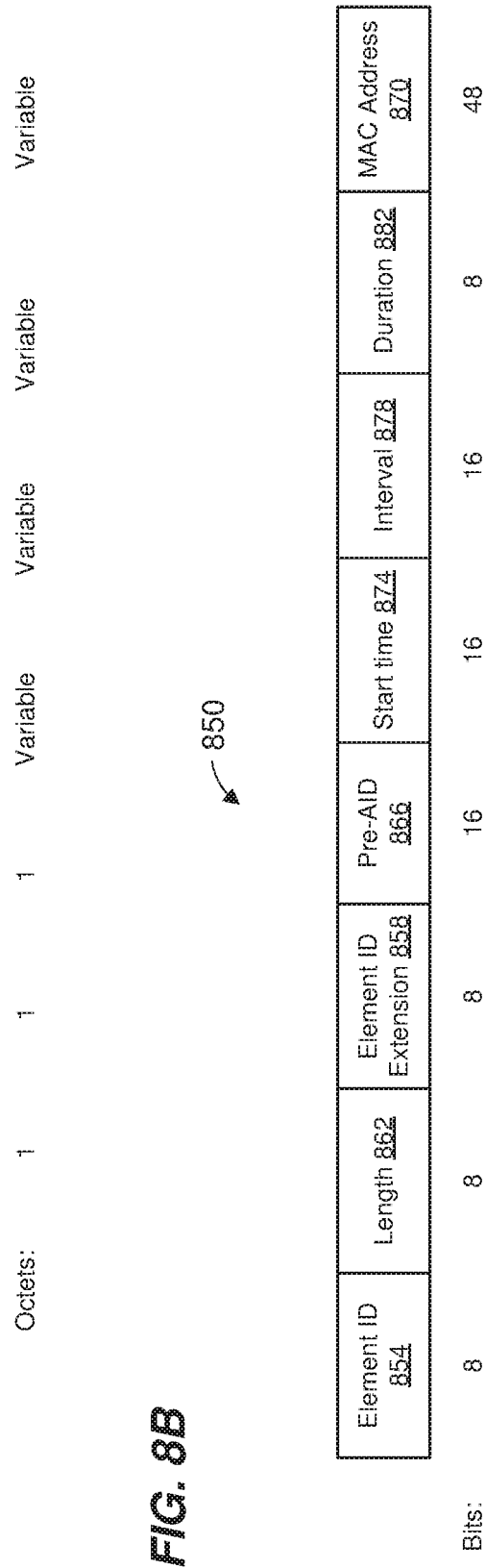
FIG. 8B is a diagram of an example information element for assigning a preliminary network ID to an unassociated client station for use during an MU ranging measurement procedure, according to an embodiment.

FIG. 8B is a diagram of an example format of an information element 850 that is included in the field 848, according to an embodiment. The information element 850 indicates an assignment of a pre-AID to an unassociated client station 154 and also provides timing information regarding an upcoming ranging measurement procedure, according to an embodiment. In an embodiment, a respective information element 850 is included in the field 848 (FIG. 8A) for multiple unassociated client stations 154, according to an embodiment. In other embodiments, the information element 850 is included in another suitable packet, frame, and/or field.

FIG. 8B illustrates examples number of bits for various fields of the information element 850 merely for illustrative purposes. In other embodiments, one or more fields have different suitable numbers of bits. FIG. 8B illustrates an example arrangement of fields within the information element 850 merely for illustrative purposes. In other embodiments, the fields of the information element 850 are arranged in different suitable manners. In some embodiments, one or more of the fields illustrated in FIG. 8B are omitted, and/or additional fields are included in the information element.

The information element 850 includes an element ID field 854 and an element ID extension field 858 that includes respective values that identify the information element 850 as being an information element that indicates an assignment of a pre-AID to a client station 154 (e.g., to an unassociated client station 154) and also indicates timing information regarding an upcoming ranging measurement procedure. In an embodiment, a wireless communication protocol specifies a plurality of different information elements, and the element ID field 854 and optionally the element ID extension field 858 indicate a particular information element among the plurality of different information elements. In an embodiment, different information elements have respective formats, and the respective values of the element ID field 854 and the element ID extension field 858 thus indicate that the information element 850 has the format illustrated in FIG. 8B (or another suitable format). In some embodiments, the element ID extension field 858 is omitted, and the value of the element ID field 854 identifies the information element 850 as being an information element that indicates an assignment of a pre-AID to a client station 154 (e.g., to an unassociated client station 154) and also indicates timing information regarding an upcoming ranging measurement procedure, and that the information element 850 has the format illustrated in FIG. 8B (with the element ID extension field 858 omitted).

The information element 850 also includes a length field 862, which indicates a length of the information element 850. In another embodiment, the length field 862 is omitted. For example, the length of the information element 850 is defined by the wireless communication protocol, and thus a communication device that receives the information element 858 determines the length of the information element 858 based on the value(s) of the element ID field 854 and optionally the element ID extension field 858, according to an embodiment.

The information element 850 further includes a pre-AID field 866 that includes a value of the pre-AID being assigned to the client station 154 (e.g., to an unassociated client station 154). In an embodiment, the information element 850 is included in a broadcast MAC data unit (e.g., a broadcast EFTM response frame, a broadcast MPDU, or another suitable broadcast MAC data unit), where the MAC data unit includes a broadcast MAC address (e.g., in a destination address field in a MAC header of the MAC data unit). In an embodiment, the information element 850 is included in a multicast MAC data unit (e.g., a multicast EFTM response frame, a multicast MPDU, or another suitable multicast MAC data unit), where the MAC data unit includes a multicast MAC address (e.g., in a destination address field in a MAC header of the MAC data unit) that corresponds to a group of multiple client stations 154. The information element 850 also includes a MAC address field 870 that includes a MAC address of the unassigned client station to which the information element 850 is intended, and the unassigned client station 154 determines, based on the MAC address field 870 having a MAC address of the client station 154, that the pre-AID in the pre-AID field 866 is being assigned to the client station 154.

The information element 850 also includes a field 874 that includes an indication of a start time of the MU ranging measurement procedure (e.g., the MU ranging measurement procedure 300), according to an embodiment. The information element 850 also includes a field 878 that includes an indication of an interval of the stages of the MU ranging measurement procedure (e.g., the interval of the stages 304). The information element 850 also includes a field 882 that includes an indication of a duration of each time slot (e.g., the times slots 308), according to some embodiments.

Referring again to FIGS. 6 and 8A, in some embodiments, the DL SU PPDU 612 includes a plurality of unicast EFTM frames addressed to respective client stations. For example, the plurality of unicast EFTM frames are included in an aggregate MPDU (A-MPDU) within the DL SU PPDU 612. Thus, in some embodiments, a plurality of unicast frames similar to the frame 800 are included in the DL SU PPDU 612, where each frame 800 includes a destination address 808 set to a unicast MAC address of a respective client station 154. In such embodiments, each frame 800 includes one information element 850, and the MAC address 870 is omitted from the information element 850, in an embodiment.

FIG. 8C is a diagram of fields within the frame body 820 (FIG. 8A), according to another embodiment. FIG. 8C illustrates examples number of octets for various fields in the frame body 820 merely for illustrative purposes. In other embodiments, one or more fields have different suitable numbers of octets. FIG. 8C illustrates an example arrangement of fields within the frame body 820 merely for illustrative purposes. In other embodiments, the fields within the frame body 820 are arranged in different suitable manners. In some embodiments, one or more of the fields illustrated in FIG. 8C are omitted, and/or additional fields are included in the frame body 820.

The contents 880 of the frame body 820 are similar to the frame body format illustrated in FIG. 8A, and like-numbered elements are not described in detail merely for purposes of brevity. The contents 880 include a plurality of fields, including a field 884, which includes timing information regarding an upcoming ranging measurement procedure. For example, in an embodiment, the timing information regarding the ranging measurement procedure includes an indication of a start time of the MU ranging measurement procedure 300, an indication of an interval of the stages of the MU ranging measurement procedure 300, and an indication of the duration of each time slot 308 of the MU ranging measurement procedure 300.

Additionally, the contents 880 include a separate field 888 having information indicating an assignment of one or more pre-AIDs to one or more respective unassociated client stations 154 for the upcoming ranging measurement procedure. In an embodiment, the field 888 includes an information element similar to the example information element 850 discussed above with respect claims 8A and 8B, but that omits the fields 874, 878, and 882.

FIG. 9 is a timing diagram of another example transmission exchange 900 in which the AP 114 performs an MU transmission a plurality client stations 154 prior to the MU ranging measurement procedure 300 that provides one or more unassociated client stations 154, among the plurality of client stations 154, with one or more respective pre-AIDs assigned to the one or more unassociated client stations 154 for use during the MU ranging measurement procedure 300, according to an embodiment. The diagram of FIG. 9 is described in the context of the example network 110 merely for explanatory purposes. In some embodiments, signals illustrated in FIG. 9 are generated by other suitable communication devices in other suitable types of wireless networks.

The diagram of FIG. 9 is similar to the diagram of FIG. 6, and like-numbered elements are not described in detail merely for purposes of brevity.

The network interface device 122 of the AP 114 processes the UL MU transmission 608 to determine which client station 154 are requesting to participate in a ranging measurement procedure. For requests to participate received from unassociated client stations 154, the network interface device 122 assigns respective pre-AIDs to the unassociated client stations 154.

In an embodiment, the network interface device 122 of the AP 114 generates a DL MU PPDU 904 that includes information acknowledging receipt of requests in the UL MU transmission 608 that were correctly received by the network interface device 122. In an embodiment, the DL MU PPDU 904 is generated to include a multi-station block acknowledgment (M-BA) frame that acknowledges receipt of requests in the UL MU transmission 608 that were correctly received by the network interface device 122.

In an embodiment, the M-BA frame in the DL MU PPDU 904 also includes pre-AIDs assigned to respective unassociated client stations 154. Upon receiving the DL MU PPDU 904, at least some unassociated client stations 154 (e.g., unassociated client stations 154 whose requests in the UL MU 608 transmission were correctly received by the AP 114) process the DL MU PPDU 904 to determine the respective pre-AIDs assigned to the unassociated client stations 154 for the upcoming MU ranging measurement procedure.

The network interface device 122 of the AP 114 then generates a DL MU PPDU 908 that includes information corresponding to an MU ranging measurement procedure, such as the example MU ranging measurement procedure 300 of FIG. 3. For example, in an embodiment, the information corresponding to the MU ranging measurement procedure includes an indication of a start time of the MU ranging measurement procedure 300, an indication of an interval of the stages of the MU ranging measurement procedure 300, and an indication of the duration of each time slot 308 of the MU ranging measurement procedure 300. In an embodiment, the DL MU PPDU 908 includes respective EFTM response frames for multiple client stations 154, where the EFTM response frames corresponding to unassociated client stations 154 include the corresponding pre-AIDs.

The multiple client stations 154 transmit respective acknowledgments in an UL MU transmission 912, wherein the respective acknowledgments acknowledge the EFTM responses in the DL MU transmission 908.

Additionally, the information corresponding to an MU ranging measurement procedure also includes pre-AIDs assigned to respective unassociated client stations 154. Upon receiving the DL SU PPDU 612, at least some unassociated client stations 154 (e.g., unassociated client stations 154 whose requests in the UL MU 608 transmission were correctly received by the AP 114) process the DL SU PPDU 612 to determine information regarding an upcoming MU ranging measurement procedure, including respective pre-AIDs assigned to the unassociated client stations 154 for the upcoming MU ranging measurement procedure.

Referring now to FIGS. 6 and 9, in other embodiments, unassociated client stations 154 randomly or pseudo-randomly select pre-AIDs from a set of AIDs reserved for use as pre-AIDs (e.g., the AP 114 will not assign AIDs for associated stations from the set of AIDs reserved for use as pre-AIDs). Thus, in some embodiments, the AP 114 does not assign pre-AIDs to unassociated client stations 154 and does not communicate assigned pre-AIDs to client stations such as described above. If multiple unassociated client stations 154 choose the same pre-AID, the AP 114 does not acknowledge EFTM requests from such client station 154. In such scenarios, an unassociated client station 154 randomly or pseudo-randomly chooses another pre-AID from the set of AIDs reserved for use as pre-AIDs and transmits another EFTM request to the AP 114 at a later time.

Figure 10:
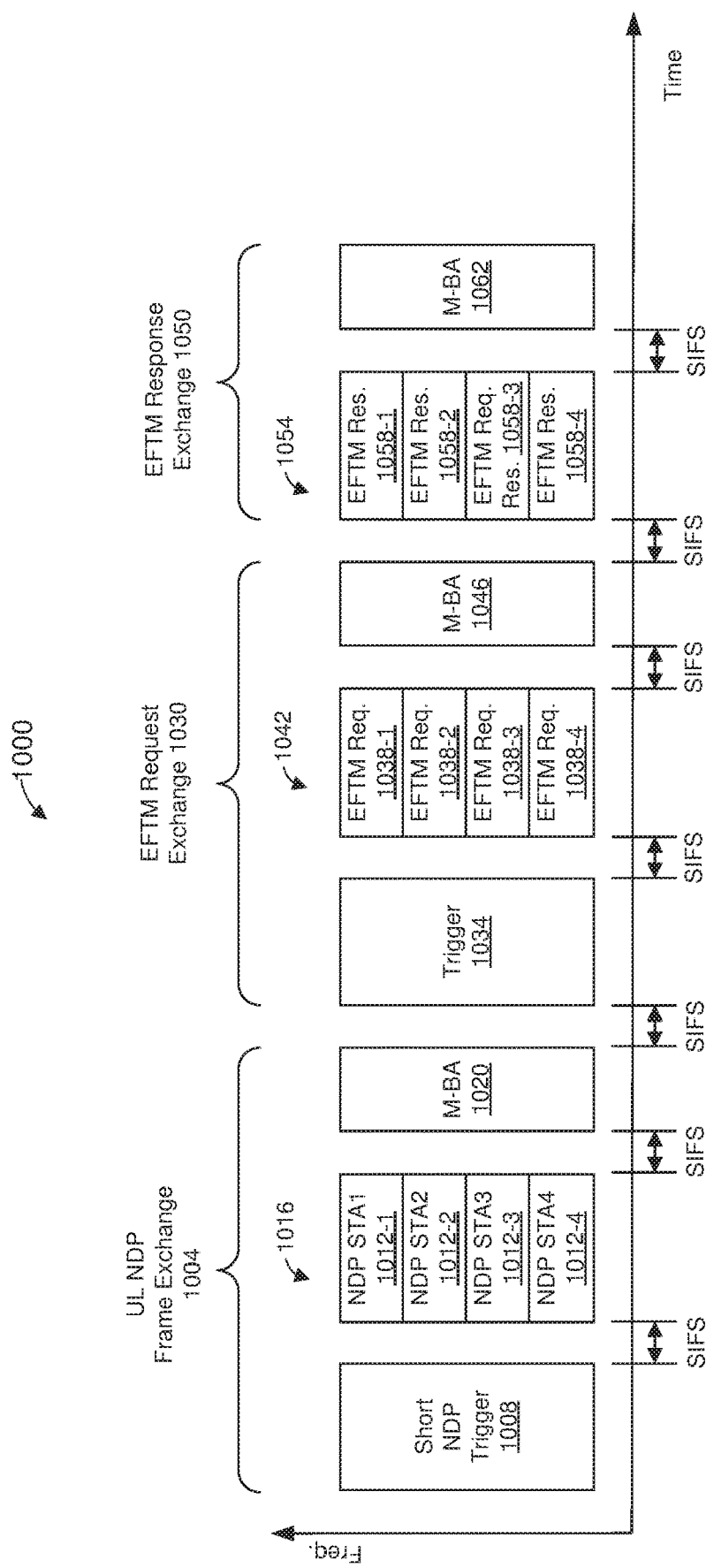
FIG. 10 is a timing diagram of another example MU ranging measurement procedure, according to another embodiment.

FIG. 10 is a timing diagram of an example ranging measurement setup procedure 1000 prior to an MU ranging measurement procedure, according to an embodiment. FIG. 10 is described in the context of the example network 110 merely for explanatory purposes. In some embodiments, signals illustrated in FIG. 10 are generated by other suitable communication devices in other suitable types of wireless networks.

During a first frame exchange 1004, a first communication device (e.g., the AP 114) transmits a DL PPDU 1008 having a trigger frame to prompt multiple second communication devices (e.g., client stations 154) to simultaneously transmit NDP feedbacks 1012 as part of an UL OFDMA NDP transmission 1016, where each client station uses several different tones in the UL OFDMA NDP transmission 1016 to send a respective request indication. In an embodiment, the trigger frame 1008 is a type of trigger frame specifically for prompting UL OFDMA NDP transmissions from unassociated client stations 154 (e.g., a trigger type field in the trigger frame 1008 is set to a particular value that corresponds to prompting UL OFDMA NDP transmissions from unassociated client stations 154). In an embodiment, the trigger frame 1008 is a type of trigger frame specifically for prompting UL OFDMA NDP transmissions from unassociated client stations 154 that want to participate in a ranging measurement procedure (e.g., a trigger type field in the trigger frame 1008 is set to a particular value that corresponds to prompting UL OFDMA NDP transmissions from unassociated client stations 154 that want to participate in a ranging measurement procedure).

In an embodiment, the trigger frame 1008 includes a starting value of pre-AIDs to be assigned (pre-AID_start), and indices (e.g., $x_i$=0, 1, 2, . . . ) of RUs that unassociated client stations 154 can use to transmit NDPs responsive to the trigger frame 1008. Thus, each $RU_i$ corresponds to a particular pre-AID (e.g., pre-AID_start+$x_i$). Each unassociated client station 154 randomly or pseudo-randomly chooses an RU in which to transmit an NDP 1012 as part of the UL OFDMA transmission 1016, and thus also chooses a pre-AID for the unassociated client station 154. In some scenarios multiple unassociated client stations 154 choose a same RU.

In some embodiments, the trigger frame in the DL PPDU 1008 is configured to prompt an UL MU transmission similar to an UL MU transmission according to the NDP feedback report procedure described in draft 2.2 of the IEEE 802.11ax Standard, dated February 2018.

The trigger frame 1008 prompts multiple unassociated client stations 154 to begin simultaneously transmitting NDPs 1012 as part of the UL MU transmission 1016 a defined time period after an end of the PPDU 1008. In an embodiment, the defined time period is the short interframe space (SIFS) defined by the IEEE 802.11 Standard. In other embodiments, another suitable time period is utilized. In some embodiments, the AP 114 (e.g., the network interface device 122) generates the trigger frame in the DL PPDU 1008 and the unassociated client stations 154 participate in the UL MU transmission 1016 according to a random access OFDMA technique such as described in draft 2.2 of the IEEE 802.11ax Standard, dated February 2018.

Each received NDP 1012 indicates to the AP 114 that a corresponding unassociated client station 154 may want to participate in a ranging measurement procedure. At this point in the procedure 1000, the AP 114 does not yet know the identities (e.g., the MAC addresses) of the unassociated client stations 154 that participated in the UL MU transmission 1016.

Responsive to the UL OFDMA transmission 1016, the AP 114 begins transmitting an acknowledgment transmission 1020 a defined time period after an end of the UL OFDMA transmission 1016. In an embodiment, the defined time period is SIFS. In other embodiments, another suitable time period is utilized.

In some embodiments, the acknowledgment transmission 1020 includes an M-BA frame. For example, in an embodiment, the acknowledgment transmission 1020 includes an M-BA frame that acknowledges multiple NDPs 1012 and that is transmitted across a same set of frequency bandwidth portions as the multiple NDPs 1012. In an embodiment, the M-BA frame acknowledges receipt of multiple NDPs 1012 using the pre-AIDs that correspond to the RUs in which NDPs 1012 were correctly received.

During an EFTM request exchange 1030, the AP 114 (e.g., the network interface device 122) generates and transmits a DL PPDU 1034 having a trigger frame to prompt multiple the unassociated client stations 154 (for which NDPs 1012 were correctly received) to simultaneously transmit EFTM request frames 1038 as part of an UL OFDMA transmission 1042. In an embodiment, the AP 114 (e.g., the network interface device 122) generates the trigger frame 1034 to include the pre-AIDs determined by the AP 114 (e.g., the network interface device 122) based on the correctly received NDPs 1012.

In some scenarios multiple unassociated client stations 154 transmit EFTM requests within a same RU, which causes a collision and which cause the AP 114 to typically not correctly receive an EFTM request from any of the multiple unassociated client stations 154 transmitting within the same RU.

Based on the UL OFDMA transmission 1042, the AP 114 (e.g., the network interface device 122) determines the identities (e.g., the MAC addresses) of unassociated client stations 154 that participated in the UL OFDMA transmission 1042 and for which the AP 114 correctly received EFTM requests 1038. For example, the EFTM request frames 1038 include respective MAC addresses of the unassociated client stations 154. Responsive to the UL OFDMA transmission 1042, the AP 114 begins transmitting an acknowledgment transmission 1046 a defined time period after an end of the UL OFDMA transmission 1042. In an embodiment, the defined time period is SIFS. In other embodiments, another suitable time period is utilized.

In some embodiments, the acknowledgment transmission 1046 includes an M-BA frame. For example, in an embodiment, the acknowledgment transmission 1046 includes an M-BA frame that acknowledges multiple EFTM request frames 1038. In an embodiment, the M-BA frame acknowledges receipt of multiple NDPs 1012 using the pre-AIDs that correspond to the RUs in which EFTM request frames 1038 were correctly received and/or using MAC addresses of the unassociated client stations 154 (e.g., determined from the correctly received EFTM request frames 1038).

In an exchange 1050, the network interface device 122 generates and transmits an MU transmission 1054 that includes respective EFTM response frames 1058 corresponding to an MU ranging measurement exchange, such as the example MU ranging measurement procedure 300 of FIG. 3. In an embodiment, each EFTM response frame 1058 is responsive to a corresponding correctly received EFTM request frame 1038, and indicates that the AP 114 will participate in a ranging measurement exchange with the client station. In an embodiment, the EFTM response frame 1058 includes information regarding the MU ranging measurement procedure 300 (e.g., one or more of an indication of a start time of the MU ranging measurement procedure 300, an indication of an interval of the stages 304 of the MU ranging measurement procedure 300, the indication of the duration of each time slot 308 of the MU ranging measurement procedure 300, etc.), according to an embodiment.

Responsive to the MU transmission 1054, the unassociated client stations 154 transmit an UL MU transmission 1062 that includes, e.g., an M-BA frame that acknowledges receipt of the EFTM response frames 1058 by the unassociated client stations 154.

In an embodiment, the EFTM request frame 1038 has a format the same as or similar to the EFTM request frame 700 of FIG. 7.

Figure 11A:
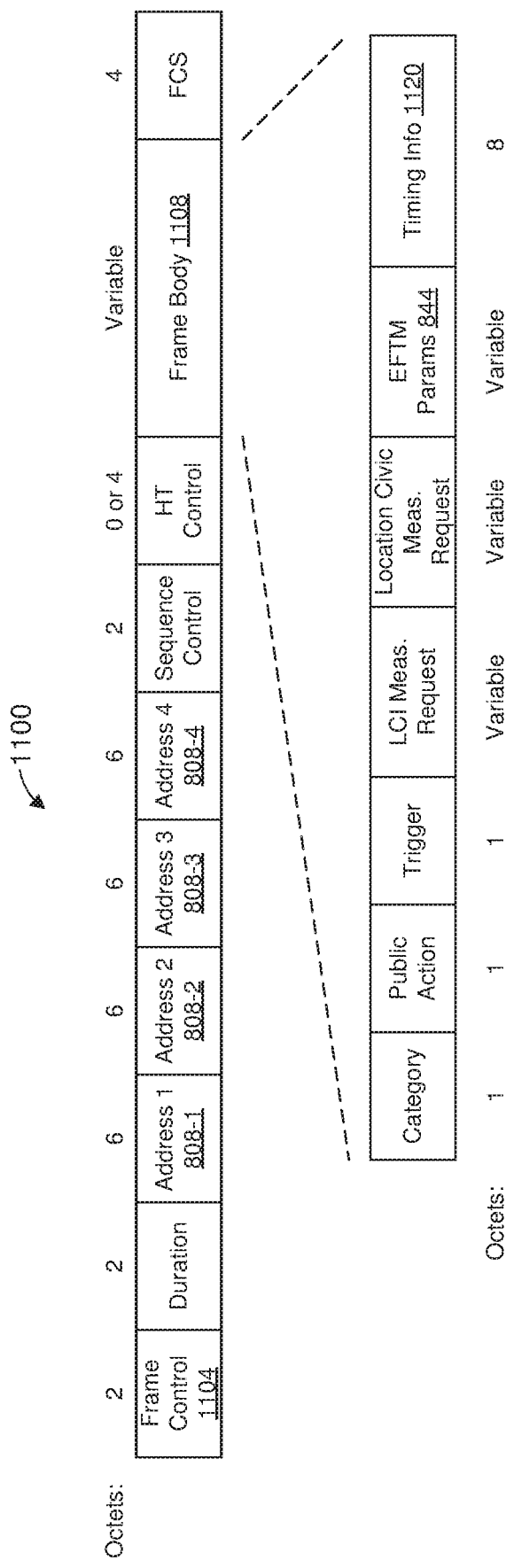
FIG. 11A is an example frame format of a response frame regarding an MU ranging measurement procedure, according to an embodiment.

FIG. 11A is a diagram an example response frame 1100 (sometimes referred to herein as an "EFTM response frame") that the AP 114 transmits as part of the DL MU transmission 1054, according to an embodiment. In other embodiments, the response frame 1100 is included in another suitable single-user or multi-user transmission.

FIG. 11A illustrates examples number of octets for various fields of the response frame 1100 merely for illustrative purposes. In other embodiments, one or more fields have different suitable numbers of bits. FIG. 11A illustrates an example arrangement of fields within the response frame 1100 merely for illustrative purposes. In other embodiments, the fields of the response frame 1100 are arranged in different suitable manners. In some embodiments, one or more of the fields illustrated in FIG. 11A are omitted, and/or additional fields are included in the response frame.

The response frame 1100 is similar to the response frame 800 of FIG. 8A, and like-numbered elements are not described in detail merely for purposes of brevity.

The response frame 1100 includes a frame control field 1104 set to a value to indicate that the frame 100 corresponds to a response to one or more requests to participate in a ranging measurement procedure.

The response frame 1100 also includes a frame body 1108. The frame body 1108 includes a plurality of fields, including a field 1120, which includes timing information regarding an upcoming ranging measurement procedure. For example, in an embodiment, the timing information regarding the ranging measurement procedure includes an indication of a start time of the MU ranging measurement procedure 300, an indication of an interval of the stages of the MU ranging measurement procedure 300, and an indication of the duration of each time slot 308 of the MU ranging measurement procedure 300.

Figure 11B:
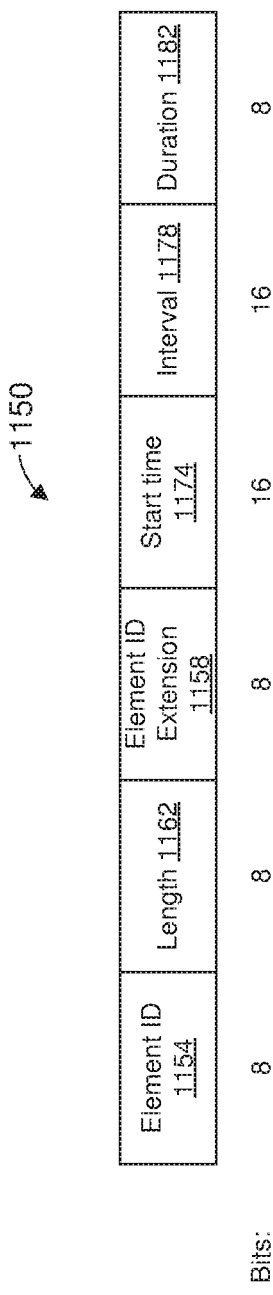
FIG. 11B is a diagram of an example information element for assigning a preliminary network ID to an unassociated client station for use during an MU ranging measurement procedure, according to an embodiment.

FIG. 11B is a diagram of an example format of an information element 1150 that is included in the field 1120, according to an embodiment. The information element 1150 provides timing information regarding an upcoming ranging measurement procedure, according to an embodiment.

FIG. 11B illustrates examples number of bits for various fields of the information element 1150 merely for illustrative purposes. In other embodiments, one or more fields have different suitable numbers of bits. FIG. 11B illustrates an example arrangement of fields within the information element 1150 merely for illustrative purposes. In other embodiments, the fields of the information element 1150 are arranged in different suitable manners. In some embodiments, one or more of the fields illustrated in FIG. 11B are omitted, and/or additional fields are included in the information element.

The information element 1150 includes an element ID field 1154 and an element ID extension field 1158 that includes respective values that identify the information element 1150 as being an information element that indicates timing information regarding an upcoming ranging measurement procedure. In an embodiment, a wireless communication protocol specifies a plurality of different information elements, and the element ID field 1154 and optionally the element ID extension field 1158 indicate a particular information element among the plurality of different information elements. In an embodiment, different information elements have respective formats, and the respective values of the element ID field 1154 and the element ID extension field 1158 thus indicate that the information element 1150 has the format illustrated in FIG. 11B (or another suitable format). In some embodiments, the element ID extension field 1158 is omitted, and the value of the element ID field 154 identifies the information element 1150 as being an information element that indicates timing information regarding an upcoming ranging measurement procedure, and that the information element 1150 has the format illustrated in FIG. 11B (with the element ID extension field 1158 omitted).

The information element 1150 also includes a length field 1162, which indicates a length of the information element 1150. In another embodiment, the length field 1162 is omitted. For example, the length of the information element 1150 is defined by the wireless communication protocol, and thus a communication device that receives the information element 1150 determines the length of the information element 1150 based on the value(s) of the element ID field 154 and optionally the element ID extension field 1158, according to an embodiment.

The information element 1150 also includes a field 1174 that includes an indication of a start time of the MU ranging measurement procedure (e.g., the MU ranging measurement procedure 300), according to an embodiment. The information element 1150 also includes a field 1178 that includes an indication of an interval of the stages of the MU ranging measurement procedure (e.g., the interval of the stages 304). The information element 1150 also includes a field 1182 that includes an indication of a duration of each time slot (e.g., the times slots 308), according to some embodiments.

In some embodiments, the timing information field 884 (FIG. 8C) includes an information element the same as or similar to the information element 1150 of FIG. 11B.

In some embodiments, the timing information field 748 of the request frame 700 (FIG. 7) and/or the timing information field 1120 of the request frame 1100 (FIG. 11A) include an information element the same as or similar to the information element 1150 of FIG. 11B. For example, in an EFTM request frame, the field 1174 includes an indication of a requested start time of an MU ranging measurement procedure, the field 1178 includes an indication of a requested interval of the stages of the MU ranging measurement procedure (e.g., the interval of the stages 304), and the field 1182 includes an indication of a requested duration of each time slot (e.g., the times slots 308), according to some embodiments.

Figure 12:
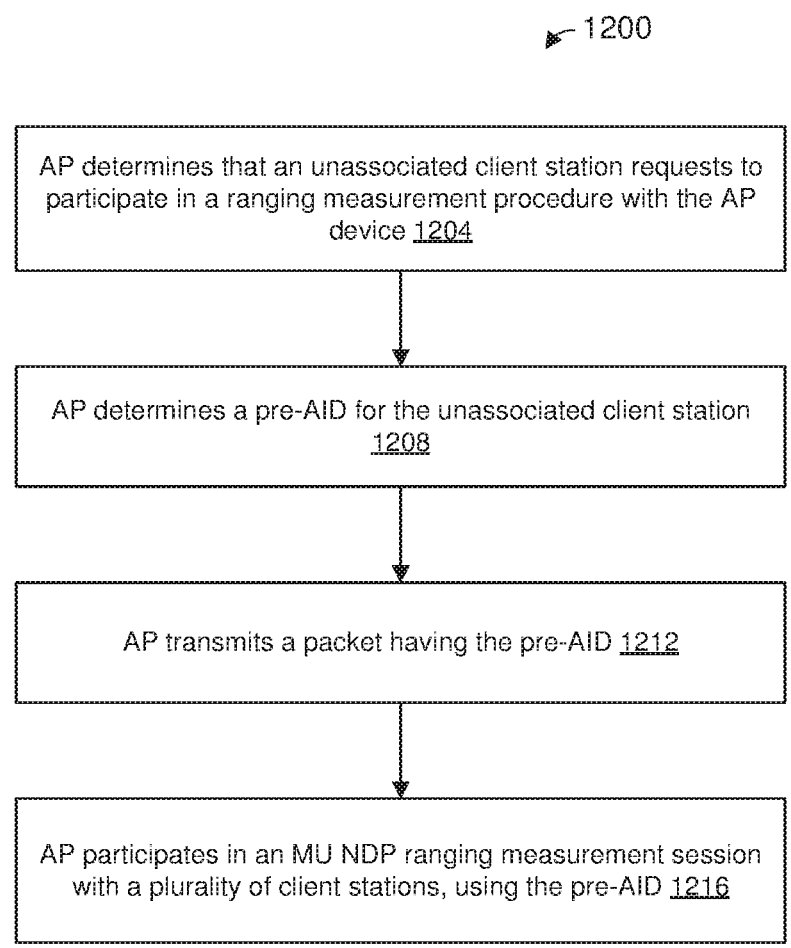
FIG. 12 is a flow diagram of an example method for participating in an MU ranging measurement procedure, according to an embodiment.

FIG. 12 is a flow diagram of an example method 1200 for performing a ranging measurement procedure, according to an embodiment. In some embodiments, the network interface device 122 of FIG. 1 is configured to implement the method 1200. The method 1200 is described, however, in the context of the network interface device 122 merely for explanatory purposes and, in other embodiments, the method 1200 is implemented by another suitable device. For instance, in an embodiment, the network interface device 162 of FIG. 1, or another suitable WLAN network interface device is configured to implement the method 1200.

The method 1200 is implemented in conjunction with the procedures, frame formats, information element formats, etc., described above in connection with one or more of FIGS. 2A, 2B, 3, 5A, 5B, 6, 7, 8A-C, and 9, in various embodiments. In other embodiments, the method 1200 is implemented in conjunction with suitable procedures, frame formats, information element formats, etc., different that those discussed above in connection with FIGS. 2A, 2B, 3, 5A, 5B, 6, 7, 8A-C, and 9.

At block 1204, the AP 114 determines (e.g., the network interface device 122 determines, the MAC processor 126 determines, etc.) that an unassociated client station 154 requests to participate in a ranging measurement procedure with the AP device. The unassociated client station 154 is not currently associated with a wireless communication network managed by the AP 114 (e.g., a BSS) and has not been assigned, by the AP 114, a network ID (e.g., an AID) as a result of becoming associated with the wireless communication network.

In an embodiment, the method further includes the AP 114 receiving the UL SU packet 408 (FIG. 4), and block 1204 includes determining that the unassociated client station 154 requests to participate in the ranging measurement procedure based on receiving the UL SU packet 408. In other embodiments, the method further includes the AP 114 receiving the UL MU packet 608 (FIGS. 6, 9), and block 1204 includes determining that the unassociated client station 154 requests to participate in the ranging measurement procedure based on receiving the UL MU packet 608.

At block 1208, the AP 114 determines (e.g., the network interface device 122 determines, the MAC processor 126 determines, etc.) a preliminary ID (e.g., a pre-AID) for the unassociated client station to be used by the unassociated client station during a ranging measurement session with the AP device while the unassociated client station remains not associated with the wireless communication network.

At block 1212, the AP 114 transmits (e.g., the network interface device 122 transmits) a packet having the preliminary network ID (e.g., the pre-AID). The packet indicates that the AP 114 has assigned the preliminary network ID to the unassociated client station 154 for use during the ranging measurement session, according to an embodiment. In an embodiment, block 1212 includes the MAC processor 126 generating an EFTM response frame that includes the pre-AID, and the PHY processor 130 generating a PHY data unit that includes the EFTM frame.

In an embodiment, block 1212 includes the AP 114 generating and transmitting (e.g., the network interface device 122 generating and transmitting) the DL packet 404 (FIG. 4). In an embodiment, block 1212 comprises transmitting the packet as an SU transmission. In an embodiment, block 1212 comprises generating a unicast frame that includes the pre-AID, and generating the packet to include the unicast frame. In another embodiment, block 1212 comprises generating a broadcast frame that includes the pre-AID, and generating the packet to include the broadcast frame.

In another embodiment, block 1212 includes the AP 114 generating and transmitting (e.g., the network interface device 122 generating and transmitting) the DL SU transmission 612 (FIG. 6). In another embodiment, block 1212 includes the AP 114 generating and transmitting (e.g., the network interface device 122 generating and transmitting) the M-BA 904 (FIG. 9). In an embodiment, block 1212 comprises transmitting the packet within an MU transmission. In an embodiment, block 1212 comprises generating respective unicast frames that include respective pre-AIDs for respective unassociated client station 154, and generating MU transmission to include the respective unicast frames.

At block 1216, after transmitting the packet at block 1212, the AP 114 participates (e.g., the network interface device 122 participates) in an MU NDP ranging measurement session with a plurality of client stations that includes the unassociated client station. Participating in the MU NDP ranging measurement session includes the AP 114 transmitting (e.g., the network interface device 122 transmitting) a trigger frame to prompt the plurality of client stations to simultaneously transmit respective NDPs as part of an uplink MU transmission corresponding to the MU NDP ranging measurement session. The trigger frame includes the preliminary network ID to prompt the unassociated client station to transmit an NDP as part of the uplink MU transmission. In an embodiment, the trigger frame includes multiple preliminary network IDs to prompt respective unassociated client stations to transmit respective NDPs as part of the uplink MU transmission.

Figure 13:
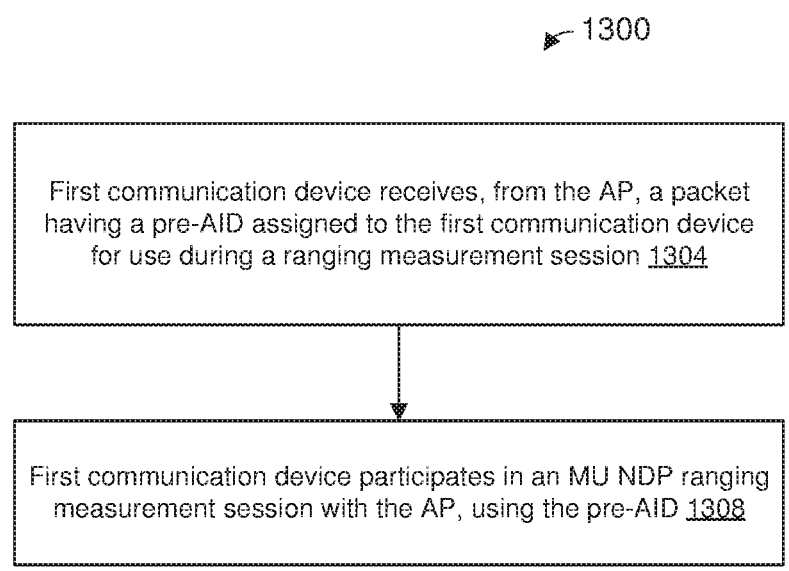
FIG. 13 is a flow diagram of another example method for participating in an MU ranging measurement procedure, according to another embodiment.

FIG. 13 is a flow diagram of an example method 1300 for performing a ranging measurement procedure, according to an embodiment. In some embodiments, the network interface device 162 of FIG. 1 is configured to implement the method 1300. The method 1300 is described, however, in the context of the network interface device 162 merely for explanatory purposes and, in other embodiments, the method 1300 is implemented by another suitable device. For instance, in an embodiment, the network interface device 122 of FIG. 1, or another suitable WLAN network interface device is configured to implement the method 1300.

The method 1300 is implemented in conjunction with the procedures, frame formats, information element formats, etc., described above in connection with one or more of FIGS. 2A, 2B, 3, 5A, 5B, 6, 7, 8A-C, and 9, in various embodiments. In other embodiments, the method 1300 is implemented in conjunction with suitable procedures, frame formats, information element formats, etc., different that those discussed above in connection with FIGS. 2A, 2B, 3, 5A, 5B, 6, 7, 8A-C, and 9.

At block 1304, a first communication device receives (e.g., an unassociated client station 154 receives, the network interface device 162 receives, etc.) a packet having a preliminary network ID (e.g., a pre-AID). The packet indicates that the AP 114 has assigned the preliminary network ID to the first communication device for use during a ranging measurement session, according to an embodiment. In an embodiment, block 1304 includes the PHY processor 170 processing the packet to extract an EFTM response frame that includes the pre-AID, and the MAC processor 166 processing the EFTM response frame to determine the pre-AID assigned to the unassociated client station 154.

In an embodiment, block 1304 includes the first communication device receiving (e.g., the unassociated client station 154 receiving, the network interface device 162 receiving, etc.) the DL packet 404 (FIG. 4). In an embodiment, block 1304 comprises receiving the packet as an SU transmission. In an embodiment, block 1304 comprises receiving within the packet a unicast frame that includes the pre-AID. In another embodiment, block 1304 comprises receiving a broadcast frame that includes the pre-AID.

In another embodiment, block 1304 includes the first communication device receiving (e.g., the unassociated client station 154 receiving, the network interface device 162 receiving, etc.) the DL SU transmission 612 (FIG. 6). In another embodiment, block 1304 includes the first communication device receiving (e.g., the unassociated client station 154 receiving, the network interface device 162 receiving, etc.) the M-BA 904 (FIG. 9). In an embodiment, block 1304 comprises receiving the packet within an MU transmission. In an embodiment, block 1304 comprises receiving a unicast frame with the MU transmission, the unicast frame addressed to the first communication device and including the pre-AID for the first communication device.

In an embodiment, the method 1300 further includes the first communication device generating and transmitting (e.g., the unassociated client station 154 generating and transmitting, the network interface device 162 generating and transmitting, etc.) the UL SU packet 408 (FIG. 4), and the packet received at block 1304 is responsive to the UL SU packet 408. In other embodiments, the method further includes the first communication device generating (e.g., the unassociated client station 154 generating, the network interface device 162 generating, the MAC processor 166 generating, etc.) a request frame that indicates that the first communication device wants to participate in a ranging measurement exchange; the method further includes the first communication device transmitting (e.g., the unassociated client station 154 transmitting, the network interface device 162 transmitting, the PHY processor 170 transmitting, etc.) the request frame as part of the UL MU packet 608 (FIGS. 6, 9); and the packet received at block 1304 is responsive to the request frame in the UL MU packet 608.

At block 1308, after receiving the packet at block 1304, the first communication device participates (e.g., the unassociated client station 154 participates, the network interface device 162 participates, etc.) in an MU NDP ranging measurement session with the AP 114. Participating in the MU NDP ranging measurement session includes receiving, at the communication device, a trigger frame from the AP 114, the trigger frame configured to prompt a plurality of communication devices, including the first communication device, to simultaneously transmit respective NDPs as part of an uplink MU transmission corresponding to the MU NDP ranging measurement session. The trigger frame includes the preliminary network ID assigned to the first communication device to prompt the first communication device to transmit a first NDP as part of the uplink MU transmission. Participating in the MU NDP ranging measurement session also includes, in response to the trigger frame, transmitting, by the first communication device, the first NDP as part of the uplink MU transmission.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for performing a ranging measurement procedure, the method comprising:
   determining, at an access point (AP) device of a wireless communication network, that an unassociated client station requests to participate in a ranging measurement procedure with the AP device, wherein the unassociated client station is not currently associated with the wireless communication network and has not been assigned, by the AP device, a network identifier (ID);
   determining, at the AP device, a preliminary network ID for the unassociated client station, the preliminary network ID to be used by the unassociated client station during a ranging measurement session while the unassociated client station remains not associated with the wireless communication network;
   transmitting, by the AP device, a packet having the preliminary network ID, wherein the packet indicates that the AP device has assigned the preliminary network ID to the unassociated client station for use during the ranging measurement session; and
   after transmitting the packet having the preliminary network ID, participating in, by the AP device, a multi-user (MU) null data packet (NDP) ranging measurement session with a plurality of client stations that includes the unassociated client station, wherein participating in the MU NDP ranging measurement session includes transmitting a trigger frame to prompt the plurality of client stations to simultaneously transmit respective NDPs as part of an uplink MU transmission corresponding to the MU NDP ranging measurement session, wherein the trigger frame includes the preliminary network ID to prompt the unassociated client station to transmit an NDP as part of the uplink MU transmission.

2. The method of claim 1, wherein transmitting the packet having the preliminary network ID comprises:
   transmitting the packet as a single-user (SU) transmission to the unassociated client station.

3. The method of claim 2, wherein:
   the packet is a first packet;
   determining that the unassociated client station requests to participate in the ranging measurement procedure with the AP device comprises receiving, at the AP device, a second packet from the unassociated station as an SU transmission, the second packet corresponding to a request to participate in a ranging measurement procedure; and
   the first packet is transmitted in response to receiving the second packet.

4. The method of claim 2, wherein:
   the packet includes an information element corresponding to assignment of preliminary network IDs to unassociated client stations in connection with a ranging measurement procedure; and
   the preliminary network ID is included in the information element.

5. The method of claim 1 wherein the AP assigns a value for the preliminary network ID to the unassociated client station from a same set of network ID values that the AP assigns for network IDs to associated client stations of the plurality of client stations.

6. The method of claim 5 wherein no two client stations from a group comprising the plurality of client stations and the unassociated client station are assigned a same value from the same set of network ID values.

7. An apparatus, comprising:
a network interface device associated with an access point (AP) device of a wireless communication network, wherein the network interface device includes one or more integrated circuits (ICs), and wherein the network interface device is configured to:
  determine that an unassociated client station requests to participate in a ranging measurement procedure with the AP device, wherein the unassociated client station is not currently associated with the wireless communication network and has not been assigned, by the AP device, a network identifier (ID),
  determine a preliminary network ID for the unassociated client station, the preliminary network ID to be used by the unassociated client station during a ranging measurement session while the unassociated client station remains not associated with the wireless communication network,
  transmit a packet having the preliminary network ID, wherein the packet indicates that the AP device has assigned the preliminary network ID to the unassociated client station for use during the ranging measurement session, and
  after transmitting the packet having the preliminary network ID, participate in a multi-user (MU) null data packet (NDP) ranging measurement session with a plurality of client stations that includes the unassociated client station, wherein participating in the MU NDP ranging measurement session includes transmitting a trigger frame to prompt the plurality of client stations to simultaneously transmit respective NDPs as part of an uplink MU transmission corresponding to the MU NDP ranging measurement session, wherein the trigger frame includes the preliminary network ID to prompt the unassociated client station to transmit an NDP as part of the uplink MU transmission.

8. The apparatus of claim 7, wherein the network interface device is configured to:
  transmit the packet as a single-user (SU) transmission to the unassociated client station.

9. The apparatus of claim 8, wherein:
  the packet is a first packet;
  the network interface device is configured to determine that the unassociated client station requests to participate in the ranging measurement procedure with the AP device comprises based on receiving a second packet from the unassociated station as an SU transmission, the second packet corresponding to a request to participate in a ranging measurement procedure; and
  the network interface device is configured to transmit the first packet in response to receiving the second packet.

10. The apparatus of claim 8, wherein the network interface device is configured to:
  generate the packet to include an information element corresponding to assignment of preliminary network IDs to unassociated client stations in connection with a ranging measurement procedure; and
  generate the information element to include the preliminary network ID.

11. The apparatus of claim 7 wherein the AP assigns a value for the preliminary network ID to the unassociated client station from a same set of network ID values that the AP assigns for network IDs to associated client stations of the plurality of client stations.

12. A method for performing a ranging measurement procedure, the method comprising:
  receiving, at a first communication device, a packet having a preliminary network identifier (ID), wherein the packet indicates that an access point (AP) device of a wireless communication network has assigned the preliminary network ID to the first communication device for use during a ranging measurement session, wherein the first communication device is not currently associated with the wireless communication network and has not been assigned, by the AP device, a network ID;
  after receiving the packet having the preliminary network ID, participating in, by the first communication device, a multi-user (MU) null data packet (NDP) ranging measurement session with the AP device, wherein participating in the MU NDP ranging measurement session includes:
    receiving, at the first communication device, a trigger frame configured to prompt a plurality of communication devices, including the first communication device, to simultaneously transmit respective NDPs as part of an uplink MU transmission corresponding to the MU NDP ranging measurement session, wherein the trigger frame includes the preliminary network ID to prompt the first communication device to transmit a first NDP as part of the uplink MU transmission, and
    in response to the trigger frame, transmitting, by the first communication device, the first NDP as part of the uplink MU transmission.

13. The method of claim 12 wherein the AP assigns a value for the preliminary network ID to the first communication device from a same set of network ID values that the AP assigns for network IDs to associated communication devices of the plurality of communication devices.

14. The method of claim 12, wherein receiving the packet having the preliminary network ID comprises:
  receiving the packet via a single-user (SU) transmission from the AP device.

15. The method of claim 14, wherein:
  the packet is a first packet;
  the method further comprises: transmitting, by the first communication device, a second packet to the AP device as an SU transmission, the second packet corresponding to a request to participate in a ranging measurement procedure; and
  the first packet is received in response to transmitting the second packet.

16. The method of claim 14, wherein:
  the packet includes an information element corresponding to assignment of preliminary network IDs to unassociated client stations in connection with a ranging measurement procedure; and
  the preliminary network ID is included in the information element.

17. An apparatus, comprising:
a network interface device associated with a first communication device, wherein the network interface device includes one or more integrated circuits (ICs), and wherein the network interface device is configured to:
  receive a packet having a preliminary network identifier (ID), wherein the packet indicates that an access point (AP) device of a wireless communication network has assigned the preliminary network ID to the first communication device for use during a ranging measurement session, wherein the first communication device is not currently associated with the wireless communication network and has not been assigned, by the AP device, a network ID, after receiving the packet having the preliminary network ID, participate in a multi-user (MU) null data packet (NDP) ranging measurement session with the AP device, wherein network interface device is configured to, as part of participating in the MU NDP ranging measurement session:

receive a trigger frame configured to prompt a plurality of communication devices, including the first communication device, to simultaneously transmit respective NDPs as part of an uplink MU transmission corresponding to the MU NDP ranging measurement session, wherein the trigger frame includes the preliminary network ID to prompt the first communication device to transmit a first NDP as part of the uplink MU transmission, and in response to the trigger frame, transmit the first NDP as part of the uplink MU transmission.

18. The apparatus of claim 17, wherein the network interface device is configured to:
receive the packet via a single-user (SU) transmission from the AP device.

19. The apparatus of claim 18, wherein:
the packet is a first packet;
the network interface device is configured to: transmit a second packet to the AP device as an SU transmission, the second packet corresponding to a request to participate in a ranging measurement procedure; and
the first packet is received in response to transmitting the second packet.

20. The apparatus of claim 18, wherein:
the packet includes an information element corresponding to assignment of preliminary network IDs to unassociated client stations in connection with a ranging measurement procedure; and
the preliminary network ID is included in the information element.

21. The apparatus of claim 17 wherein the AP assigns a value for the preliminary network ID to the first communication device from a same set of network ID values that the AP assigns for network IDs to associated communication devices of the plurality of communication devices.

* * * * *